United States Patent [19]

Toba et al.

[11] Patent Number: 5,470,930
[45] Date of Patent: Nov. 28, 1995

[54] PROCESS FOR PRODUCING POLYMER HAVING HYDROXYL GROUP AT BOTH TERMINALS

[75] Inventors: Taketo Toba, Hyogo; Kazuo Takei, Osaka; Toshiaki Matsunaga, Osaka; Hiroyuki Ikeuchi, Osaka; Fumihide Tamura, Shiga, all of Japan

[73] Assignee: Nippon Shokubai Co., Ltd., Osaka, Japan

[21] Appl. No.: 197,177

[22] Filed: Feb. 16, 1994

[30] Foreign Application Priority Data

Feb. 18, 1993 [JP] Japan ................... 5-029486

[51] Int. Cl.$^6$ ................... C08F 2/00
[52] U.S. Cl. ............ 526/204; 526/208; 526/209; 526/220; 526/222; 526/229; 526/229.5; 526/328; 526/307.6; 526/318.42; 526/329.2; 526/329.7; 526/346
[58] Field of Search ................... 526/210, 225, 526/234, 204, 208, 209, 220, 222, 229, 229.5, 328, 307.6, 318.42, 329.2, 329.7, 346

[56] References Cited

U.S. PATENT DOCUMENTS

| 3,388,109 | 11/1968 | Hawkins et al. |
|---|---|---|
| 3,673,168 | 6/1972 | Burke, Jr. et al. ........... 526/229.5 |
| 4,207,238 | 6/1980 | Gilles. |
| 4,238,397 | 12/1980 | Gilles. |
| 4,600,755 | 7/1986 | Das et al. |

FOREIGN PATENT DOCUMENTS

| 1110868 | 7/1961 | Germany ................... 526/225 |
|---|---|---|
| 256712A1 | 5/1988 | Germany. |
| 60-110708 | 6/1985 | Japan. |
| 60-240716 | 11/1985 | Japan ................... 526/210 |
| 61-271306 | 12/1986 | Japan. |
| 63-146909 | 6/1988 | Japan. |
| 964533 | 7/1964 | United Kingdom. |
| 93/03066 | 2/1993 | WIPO. |

OTHER PUBLICATIONS

Patent Abstract of Japan—JP A 58–069206–Apr. 25, 1983, vol. 7.
Patent Abstract of Japan—JP A 61–012707–Jan. 21, 1986.
Patent Abstract of Japan—JP A 63–130603 Jun. 6, 1988, vol. 12, 382.
Patent Abstract of Japan—JP A 63–146909 Jun. 18, 1988 vol. 12, 410.
Journal of Polymer Science: Part A–1, vol. 9 pp. 2029–2038, published in 1971.
Journal of Polymer Science: vol. 1, pp. 237–244, published in 1946.
Journal of Polymer Science: vol. 1, pp. 466–474, published in 1946.
Makromol. Chem: vol. 177, pp. 3139–3157, published in 1976.

*Primary Examiner*—Joseph L. Schofer
*Assistant Examiner*—N. Sarofin
*Attorney, Agent, or Firm*—Armstrong, Westerman, Hattori, McLeland & Naughton

[57] ABSTRACT

This invention provides a production process by which a polymer having a hydroxyl group at both terminals can be easily obtained with a cheap price and good efficiency from a wide field of vinyl-based monomers including polar ones. In this process, a polymerization reaction of a vinyl-based monomer (a) is performed by using hydrogen peroxide (b) and, on this occasion, either one or both of a hydrogen peroxide-decomposing accelerator (c) and an amphiphilic compound (d) are further used and any component other than the (a), (b), (c) and (d) is not substantially used.

8 Claims, No Drawings

5,470,930

PROCESS FOR PRODUCING POLYMER HAVING HYDROXYL GROUP AT BOTH TERMINALS

TECHNICAL FIELD

The present invention relates to a process for producing a useful polymer having a hydroxyl group at both terminals capable of reacting with various kinds of functional groups.

BACKGROUND ART

A polymer having a hydroxyl group at both terminals is able to easily convert the hydroxyl group into other functional groups by carrying out a suitable reaction on the terminal hydroxyl group, and also, the polymer itself converts into a macromolecule and/or a network molecule by using reactivity of the terminal hydroxyl group and carrying out a suitable reaction on this hydroxyl group and, as a result, the polymer becomes a high-molecular compound having excellence in various properties such as strength, heat resistance, weather resistance, durability and so forth.

This polymer having a hydroxyl group at both terminals has, for example, the following great advantages by displaying a feature such as having a hydroxyl group at both terminals.

In a case where the polymer is used as a raw material (a crosslinking agent and the like) for various kinds of resins such as a polyester resin, a polyurethane resin, a polycarbonate resin and the like, since there is not any unreacted component spoiling physical properties of a material, all polymers are surely assembled in a resin-crosslinked structure.

A polymer in which a functional group has been introduced into a side chain by copolymerizing a vinyl-based monomer having a functional group such as a hydroxyl group, a carboxyl group, an amino group, a polymerizable unsaturated group and the like (hereinafter, abbreviated as "a copolymer of a functional group-containing vinyl-based monomer"); when said polymer is used for a reaction, its terminal becomes a play part (a free terminal) which is not assembled in the resin (-crosslinked) structure, but such a thing does not occur in a polymer having a hydroxyl group at both terminals.

Compared with the copolymer of a functional group-containing vinyl-based monomer, because scattering in the distance between the functional groups is very small, the distance between reacting sites (crosslinking sites) is nearly constant, so that a homogeneous resin (-crosslinked) structure is made.

In a case of a copolymer of a functional group-containing vinyl-based monomer, even if the synthesis of a thermoplastic polymer is attempted by making a material of 2.0 in the average number of functional groups and by allowing this to react with a chain-elongating agent having two functionalities, since a polymer having three or more functionalities is statistically included because of a reason originated from the synthetic process, a thermosetting polymer is obtained as the major part, and a thermoplastic polymer cannot be synthesized. On the other hand, in a case of a polymer having a hydroxyl group at both terminals and not containing a polymer having three or more functionalities, a thermoplastic polymer of which chain has been elongated can be easily synthesized.

The polymer like this having a hydroxyl group at both terminals, by taking the above-described advantages, is very useful as a raw material or an additive for various resins such as a polyester resin, a polyurethane resin, a polycarbonate resin and the like and for various block polymers, and further, the polymer itself is very useful for uses such as a coating (a powder coating, a high solid coating, a low temperature curable coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curable resin, thermosetting type elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather and the like.

As the polymer having a hydroxyl group used hitherto for the above-mentioned uses are cited a copolymer of a vinyl-based monomer having a hydroxyl group on a side chain as well as a polyether, polyester, polybutadiene and polycarbonate having a hydroxyl group at a terminal and the like. First, since the copolymer of a vinyl-based monomer having a hydroxyl group on a side chain is prepared by a random type radical polymerization reaction between a monomer having a hydroxyl group and a monomer having no hydroxyl group, by-product formation of a copolymer having no hydroxyl group is difficult to suppress and, in order to avoid this formation, it is necessary to increase the hydroxyl group content in the copolymer and also, there is found scattering in the number of hydroxyl groups contained in one molecule. Because of this, in a case where a reaction is carried out between the copolymer of a vinyl-based monomer having a hydroxyl groups on a side chain and a polyfunctional compound capable of reacting with a hydroxyl group, a polymer showing sufficient stretching (processing performance for bending is excellent) and toughness is not obtained by reasons of remaining unreacted copolymer and large scattering in a distance between reaction sites, and by that a play chain part which does not directly participate in the structure of a crosslinked matter obtained after reaction is formed and a hydroxyl group not participating in the reaction remains. On the other hand, polyether, polyester, polybutadiene and the like having a hydroxyl group at a terminal, because they have a hydroxyl group at a polymer terminal, have a little defect which a copolymer of a vinyl-based monomer having a hydroxyl group on a side chain has. However, in a case of the polyether because of an ether bond on a main chain, in a case of the polyester because of an ester bond on a main chain, and in a case of the polybutadien because of an unsaturated double bond on a main chain, these polymers have defects such as badness in weather resistance, water resistance, heat resistance and the like.

As described above, at present, among polymers having a hydroxyl group, which are used as raw materials for the aforementioned uses, as additives for various resins and as raw materials for the resins there is not found any member satisfactory for all demands and capabilities such as toughness, stretching (processing performance for bending), weather resistance, water resistance and the like.

Although it is considered that a problem of this sort may be solved by a vinyl-based polymer having a hydroxyl group at both terminals, as mentioned below, the real situation is that any process for producing industrially a polymer having a hydroxyl group at both terminals from a wide range of vinyl-based monomers including polar vinyl-based monomers such as acrylic acid, an acrylic acid ester, methacrylic acid, a methacrylic acid ester and the like has not yet been established.

An example of a process for producing a vinyl-based polymer having a hydroxyl group at a terminal is a process such as introducing one hydroxyl group into one terminal of the polymer by using 2-mercaptoethanol and the like as a chain-transfer agent and introducing another one (as an average) hydroxyl group into a polymer molecule by copolymerizing with 2-hydroxyethyl methacrylate and the like.

However, in this process, although two hydroxyl groups per one molecule of a polymer are introduced as average, only one of the two hydroxyl groups is introduced into one terminal of the polymer and another hydroxyl group is introduced not into the terminal, but into the middle of a main chain. Furthermore, since another one hydroxyl group is introduced by a copolymerization reaction, the total number of hydroxyl groups per one molecule of the polymer is in a scatter distribution such as being from one to three or more, and a wide distribution is seen in a distance between hydroxyl groups. Accordingly, an obtained polymer cannot almost display the aforementioned merit which the polymer having a hydroxyl group at both terminals has. Furthermore, because of adding a mercaptan compound, there are problems that the polymerization reaction becomes extremely slow, the polymerization conversion does not rise, and the smell of residual mercaptan remains.

Examples of a process for producing a vinyl-based polymer having a hydroxyl group at both terminals are, as shown in the undermentioned (i) to (iii), processes comprising carrying out a radical polymerization reaction of a vinyl-based monomer in the presence of various kinds of initiators and chain-transfer agents and the like.

(i) A process for producing a polymer having a hydroxyl group at both terminals by polymerizing styrene or butadiene by using an initiator having a hydroxyl group (refer to "Journal of Polymer Science", Part A1, Volume 9, p.2029, published in 1971).

(ii) A process for producing a polymer having a hydroxyl group at both terminals, comprising a thermal polymerization reaction or a photopolymerization reaction carried out by using a dithiocarbamate or thiuram disulfide, both of which have a hydroxyl group, as an initiator, or comprising a polymerization reaction carried out by using the dithiocarbamate or thiuram disulfide as a chain transfer agent and using hydrogen peroxide and the like as an initiator (refer to Japanese Official Patent Provisional Publication No. showa 61-271306).

(iii) A process for producing a polymer having a hydroxyl group at both terminals, comprising a polymerization reaction carried out by using a disulfide, a trisulfide or the like having a hydroxyl group at both terminals as a chain transfer agent (refer to Japanese Official Patent Provisional Publication No. showa 54-47782.

However, the above-mentioned processes (i) to (iii) for producing a polymer having a hydroxyl group at both terminals have respective defects, as mentioned below, and it is not easy to synthesize a polymer having a hydroxyl group at both terminals surely, with a cheap price, simply and industrially from many kinds of vinyl-based monomers.

First, in the process (i), there is a problem that a usable vinyl-based monomer is limited to butadiene and styrene, and a polar vinyl-based monomer such as an acrylic acid ester, a methacrylic acid ester and the like cannot be used.

Next, a polymerization process such as the process (ii) using a dithiocarbamate or thiuram disulfide, both of which have a hydroxyl group, as an initiator and a polymerization process such as the processes (ii) and (iii) using a disulfide or the like having a hydroxyl group as a chain transfer agent have the following disadvantage: the above-mentioned sulfur compounds used as an initiator or chain transfer agent are unstable, their treating is difficult and coloring of a produced polymer is seen.

Thus, it is considered that if hydrogen peroxide is used as an initiator, a produced polymer can be prevented from coloring. However, if, as the process (ii), hydrogen peroxide is jointly used with a chain transfer agent such as the aforementioned sulfur compounds and the like, there still occurs the unpreferable problem that a produced polymer is colored.

Accordingly, there is desired an initiator system comprising hydrogen peroxide which is not jointly used with a chain transfer agent.

Actually, there is known a process comprising introducing a hydroxyl group into a terminal of poly(meth) acrylate by using hydrogen peroxide: for example, there are the following processes (iv) and (v).

(iv) A process for producing a polymer having a hydroxyl group at an terminal by using aqueous hydrogen peroxide, ferrous sulfate, a phase transfer catalyst (cetyltrimethylammonium bromide) and sulfuric acid (0.01N) and polymerizing methyl methacrylate or methyl acrylate by an emulsion polymerization method (refer to "Journal of Polymer Science", Volume 1, p.237 and p.466, published in 1946 (authors: J. H. Baxendale and M. G. Evans)).

(v) A process for producing a polymer, having a hydroxyl group at both terminals, of methyl methacrylate by using hydrogen peroxide and methanol and polymerizing methyl methacrylate under irradiation of ultraviolet rays (wave length 253.7 nm) at normal temperature (refer to Japanese Official Patent Provisional Publication No. showa 51-126283 and the journal "Makromolecule Chemistry", Volume 177, pp.3139–3157, published in 1976).

However, the aforementioned processes (iv) and (v) using hydrogen peroxide have the following problems.

The aforementioned document describing the process (iv) assumes an elementary reaction to introduce a hydroxyl group into both terminals and concludes that a hydroxyl group was able to be introduced into both terminals because there exists a relational formula which is determined from a viscosity, a monomer concentration and an initial concentration of hydrogen peroxide. In addition, as for a polymer obtained, the document does not carry out any analysis such as determination of the number of terminal hydroxyl groups.

The polymer obtained by the process (v) has a low average number of terminal hydroxyl groups, 1.2, which is determined by an acetylation method where in the polymer is esterified by a pyridine solution of anhydrous acetic acid and the excessive agent is titrated with a potassium hydroxide solution.

Thus, in the processes (iv) and (v), although hydrogen peroxide is used, a polymer having a hydroxyl group at both terminals, which is one of telechelic polymers, is not actually obtained or is only obtained as an insufficient one.

As described above, at the present time there has not been established any process for producing industrially a polymer having a hydroxyl group at both terminals from a wide field of vinyl-based monomers including polar vinyl-based monomers such as acrylic acid, an acrylic acid ester, methacrylic acid, a methacrylic acid ester and the like.

Under these circumstances, it is an object of the present invention to provide a process by which a polymer having a hydroxyl group at both terminals can be surely obtained with ease, a cheap price and good efficiency from a wide field of vinyl-based monomers including polar vinyl-based monomers such as acrylic acid, an acrylic acid ester, methacrylic acid, a methacrylic acid ester and the like.

DISCLOSURE OF INVENTION

A hydroxyl group cannot be introduced surely with good efficiency into both terminals of a polymer by the aforementioned conventional processes using hydrogen peroxide. The reason is considered as follows: since a solvent such as an organic solvent and the like coexists, chain transfer to this solvent occurs; in a case of using hydrogen peroxide alone, efficiency for selective formation of a hydroxyl free radical is bad; therefore, there is not obtained a polymer having a hydroxyl group at both terminals.

Thus, the inventors thought of and went through a process comprising carrying out a polymerization reaction of a vinyl-based monomer in the presence of hydrogen peroxide with substantially no use of a solvent and further comprising using, on this occasion, either one or both of a hydrogen peroxide-decomposing accelerator as a catalyst to much enhance efficiency for formation of a hydroxyl free radical from hydrogen peroxide and an amphiphilic compound as a compound to increase a contact area between hydrogen peroxide and the vinyl-based monomer. As a result, the inventors confirmed it by experiments that this process makes it possible to industrially produce the polymer having a hydroxyl group at both terminals from a wide field of vinyl-based monomers including polar ones, and thus completed this invention.

Therefore, the process of producing the polymer in this invention is characterized as, in the process of polymerization reaction of a vinyl-based monomer (a) using hydrogen peroxide (b), additionally using hydrogen peroxide-decomposing accelerator (c) and/or amphiphilic compound (d) while not substantially using any components other than the above-mentioned four components; (a), (b), (c) and (d).

The polymer obtained by this production process is a polymer having a hydroxyl group at both terminals (this polymer is hereinafter referred to as "polymer A").

The following is an explanation of the process of producing the polymer in this invention.

The vinyl-based monomer (a) used in this invention means an unsaturated monomer having a polymeric double bond between carbons within a molecule and there are no specific limitations as long as it is one of the conventional vinyl-based monomers known to the public; for example, (meth)acrylic acid; alkyl ester (meth)acrylates such as methyl (meth)acrylate, ethyl (meth)acrylate, butyl (meth)acrylate, cyclohexyl (meth)acrylate, 2-ethylhexyl (meth)acrylate, n-octyl (meth)acrylate, dodecyl (meth)acrylate, stearyl (meth)acrylate and the like; allyl ester (meth)acrylates such as benzyl (meth)acrylate and the like; substituted alkyl (meth)acrylates such as 2-hydroxyethyl (meth)acrylate, hydroxypropyl (meth)acrylate, glycidyl (meth)acrylate, 2-aminoethyl (meth)acrylate, γ-(methacryloyloxypropyl) trimethoxysilane, 4-methacryloyloxy-2,2,6,6-tetramethylpiperidine, a sodium salt of 2-sulfoethyl methacrylate and the like; (meth)acrylic acid derivatives such as methoxyethyl (meth)acrylate, a (meth)acrylic acid-ethylene oxide adduct and the like; maleic anhydride, maleic acid, and monoalkyl and dialkyl esters of maleic acid; fumaric acid, and monoalkyl and dialkyl esters of fumaric acid; aromatic vinyl-based monomers such as styrene, α-methylstyrene, methylstyrene, chlorostyrene, styrenesulfonic acid, a sodium salt of styrenesulfonic acid, and the like; fluorine-containing vinyl-based monomers such as perfluoromethyl (meth)acrylate, perfluoroethyl (meth)acrylate, perfluorobutyl (meth)acrylate, perfluorooctyl (meth)acrylate, trifluoromethylmethyl (meth)acrylate, 2-trifluoromethylethyl (meth)acrylate, diperfluoromethylmethyl (meth)acrylate, 2-perfluoroethylethyl (meth)acrylate, 2-perfluoromethyl-2-perfluoroethylethyl (meth)acrylate, triperfluoromethylmethyl (meth)acrylate, 2-perfluoroethyl-2-perfluorobutylethyl (meth)acrylate, 2-perfluorohexylethyl (meth)acrylate, 2-perfluorodecylethyl (meth)acrylate, 2-perfluorohexadecylethyl (meth)acrylate, perfluroethylene, perfluropropylene, vinylidene fluoride and the like; trialkyloxysilyl group-containing vinyl-based monomers such as vinyltrimethoxysilane, vinyltriethoxysilane and the like; silicon-containing vinyl-based monomers such as γ-(methacryloyloxypropyl) trimethoxysilane and the like; maleimide derivatives such as maleimide, methylmaleimide, ethylmaleimide, propylmaleimide, butylmaleimide, octylmaleimide, dodecylmaleimide, stearylmaleimide, phenylmaleimide, cyclohexylmaleimide and the like; nitrile group-containing vinyl-based monomers such as acrylonitrile, methacrylonitrile and the like; amide group-containing vinyl-based monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; dienes such as butadiene, isoprene and the like; vinyl chloride, vinylidene chloride, allyl chloride, allyl alcohol and the like. These may be used either as one kind alone or in combination of plural kinds.

As seen above, the vinyl-based monomer (a) used in this invention may include a case having a functional group such as a hydroxyl group, a carboxyl group, an amino group, a polymerizable unsaturated group and the like in the molecule.

Especially, in a case where a relatively high crosslinking density is required, for example, in the coating use and the like, it is preferable that some amounts of a vinyl-based monomer having a functional group is jointly used. An amount for use of the vinyl-based monomer having a functional group is not especially limited, but, for example, in a case of a vinyl-based monomer having a hydroxyl group, it is preferable that the vinyl-based monomer having a hydroxyl group is in an amount of 1 to 50% by weight based on the whole used vinyl-based monomers (a), and more preferable that it is in an amount of 5 to 30% by weight.

Also, it is preferable that a vinyl-based monomer having a carboxyl group is in an amount of 0.5 to 25% by weight based on the whole used vinyl-based monomers (a), and more preferable that it is in an amount of 1 to 10% by weight.

The vinyl-based monomer (a), as mentioned above, is not especially limited as far as it is a vinyl-based monomer hitherto known in public, but, for example, in a case where the transparency, weather resistance, water resistance and so forth are required, it is preferable that a (meth)acrylic acid-based monomer is a main component. In this case, it is preferable that the (meth)acrylic acid-based monomer is contained in an amount of 40% or more by weight based on the whole vinyl-based monomers (a).

Also, in a case where luster, paint film hardness and the like are required, it is preferable to use an aromatic vinyl-based monomer. In this case, it is preferable that the aromatic vinyl-based monomer is contained in an amount of 40% or more by weight based on the whole vinyl-based monomers (a).

Furthermore, in a case where water-repelling and oil-repelling performance and pollution-preventive performance and the like are required, it is preferable to use a fluorine-containing vinyl-based monomer. In this case, it is preferable that the fluorine-containing vinyl-based monomer is contained in an amount of 10% or more by weight based on the whole vinyl-based monomers (a).

Still further, in a case where adhesive performance with an inorganic material and pollution-preventive performance and the like are required, it is preferable to use a silicon-containing vinyl-based monomer. In this case, it is preferable that the silicon-containing vinyl-based monomer is contained in an amount of 10% or more by weight based on the whole vinyl-based monomers (a).

The hydrogen peroxide (b) used in this invention can be used as aqueous hydrogen peroxide which is an industrially available aqueous solution of hydrogen peroxide. In a case of using hydrogen peroxide (b) as aqueous hydrogen peroxide, the amount of water contained in the aqueous hydrogen peroxide is adjusted at about 10% by weight or less based on the amount of whole components.

An amount for use of hydrogen peroxide (b) is determined automatically according to the molecular weight of an aimed polymer (A), however, generally, a preferable amount is in a range of from 0.5 to 30% by weight based on the vinyl-based monomer (a).

This invention uses either one or both of the hydrogen peroxide-decomposing accelerator (c) and the amphiphilic compound (d) together with hydrogen peroxide (b) in carrying out the polymerization reaction of the vinyl-based monomer (a).

The hydrogen peroxide-decomposing accelerator (c) used in this invention is a compound which can decompose hydrogen peroxide (b) selectively and accelerate formation of a hydroxyl free radical with good efficiency and thereby accelerate the polymerization reaction. However, to this accelerator (c) cannot be applied all substances generally known as ones that accelerate decomposition of hydrogen peroxide. The reason is as follows: the polymer having a hydroxyl group both terminals cannot be synthesized with good efficiency until the accelerator (c) decompose hydrogen peroxide (b) into hydroxyl free radicals with good efficiency; for example, in a case of using a substance such as sodium hydroxide and the like which accelerates decomposition of hydrogen peroxide but forms a hydroxyl free radical with bad efficiency, there is only obtained a polymer which is low in average number of terminal hydroxyl groups.

The hydrogen peroxide-decomposing accelerator (c) which can be used in this invention is not especially limited. However, as its examples, there can be cited a sulfonic acid compound, an inorganic acid, an onium salt, a heterocyclic amine and the like as mentioned below.

The sulfonic acid compound is not especially limited. However, as its examples, there can be cited aromatic sulfonic acids such as benzenesulfonic acid, benzenedisulfonic acid, naphthalenesulfonic acid, naphthalenedisulfonic acid, p-toluenesulfonic acid, chlorobenzenesulfonic acid, p-phenolsulfonic acid, 1-naphthol-4-sulfonic acid, 2-naphthylamine-6-sulfonic acid, dodecylbenzenesulfonic acid, p-phenolsulfonic acid and the like; aliphatic sulfonic acids such as methanesulfonic acid, ethanesulfonic acid, propanesulfonic acid, octanesulfonic acid and the like: alicyclic sulfonic acid; ion exchange resins such as AMBERLYST 15, made by ORGANO, and the like; and the like. Among these, preferred are benzenesulfonic acid, p-toluenesulfonic acid, dodecylbenzenesulfonic acid and methanesulfonic acid. According to the amount for use of the sulfonic acid compound, there can be changed a number-average molecular weight of a polymer A obtained.

However, this invention does not use any metal salt of the sulfonic acid compound such as potassium benzenesulfonate, sodium dodecylbenzenesulfonate, potassium m-benzenedisulfonate, sodium dioctylsulfosuccinate and the like. In a case of using the metal salt of sulfonic acid compound, there is only obtained a polymer which is low in both of the average number of terminal hydroxyl groups and a gel portion percent which is mentioned later and determined by using a trifunctional isocyanate compound.

The inorganic acid is not especially limited. However, as its examples, there can be cited hydrochloric acid, hydrofluoric acid, hydrobromic acid, hydroiodic acid, perchloric acid, chlorous acid, hypochlorous acid, periodic acid, sulfuric acid, fuming sulfuric acid, sulfurous acid, nitric acid, fuming nitric acid, manganic acid, permanganic acid, chromic acid, dichromic acid, phosphoric acid, phosphorous acid, hypophosphorous acid, polyphosphoric acid, hypophosphoric acid, orthophosphoric acid, metaphosphoric acid, pyrophosphoric acid and furthermore, solid acids such as heteropolyacids, silica gel, silica alumina, zeorite, titanium oxide and the like, and gaseous acids such as hydrogen chloride, hydrogen fluoride and the like. Among these, sulfuric acid and hydrochloric acid are preferable. Moreover, in a case of using the inorganic acid in form of an aqueous solution, the amount of water contained in the solution is adjusted at about 10% by weight or less based on the amount of whole components.

The onium salt is not especially limited. However, as its examples, there can be cited quaternary ammonium salts such as triethylbenzylammonium chloride, tetraethylammonium chloride, triethylbenzylammonium bromide, trioctylmethylammonium chloride, tributylbenzylammonium chloride, trimethylbenzylammonium chloride, N-laurylpyridinium chloride, trimethylbenzylammonium hydroxide, tetramethylammonium hydroxide, trimethylphenylammonium bromide, tetramethylammonium bromide, tetraethylammonium bromide, tetra-n-butylammonium bromide, tetra-n-butylammonium hydrogen sulfate, N-benzylpicolinium chloride, tetramethylammonium iodide, tetra-n-butylammonium iodide, N-lauryl-4-picolinium chloride and the like; phosphonium salts such as tetrabutylphosphonium chloride, tetrabutylphosphonium bromide and the like; sulfonium salts such as trimethylsulfonium iodide, trimethylsulfonium boron tetrafluoride, methyldiphenylsulfonium boron tetrafluoride and the like; and other kinds of onium salts. Among these, preferred are tetra-n-butylammonium hydrogen sulfate, tetrabutylphosphonium bromide, trimethylsulfonium boron tetrafluoride and methyldiphenylsulfonium boron tetrafluoride. An effect of the onium salt upon accelerating decomposition of hydrogen peroxide changes according to the kind of a pair ion of the onium salt and, especially, very effective onium salts are hydrogen sulfates of ammonium salts, bromides of phosphonium salts, and boron tetrafluorides of sulfonium salts.

The heterocyclic amine is not especially limited. However, as its examples, there can be cited pyrroles of 5-membered ring containing one nitrogen atom such as pyrrole, indole, carbazole, oxazole, thiazole and the like; imidazoles of 5-membered ring containing two nitrogen atoms such as imidazole, pyrazole and the like; pyridines of 6-membered ring containing one nitrogen atom such as pyridine, quinoline, isoquinoline and the like; alkaroids such as nicotine, quinine and the like. Among these, preferred are pyridine, indole and carbazole.

The hydrogen peroxide-decomposing accelerator (c) may be used either as one kind alone or in combination of two or more kinds.

A preferable amount for use of the hydrogen peroxide-decomposing accelerator (c) is in a range of 0.01 to 20.0% by weight, more preferably 0.01 to 10.0% by weight, most preferably 0.01 to 5.0% by weight, based on the amount of whole components. In a case where the amount for use of the accelerator (c) is smaller than 0.01% by weight, any effect as a decomposing accelerator is not seen. Even if the accelerator (c) is used in an amount larger than 20.0% by weight, much lowering of the number-average molecular weight is not seen and, in addition, problems occurs that a polymer colors and that the accelerator (c) is difficult to separate in washing with water during a purification process.

The amphiphilic compound (d) used in this invention is a compound which has affinity with both of the hydrogen peroxide (b) and vinyl-based monomer (a) and can increase a contact area between the hydrogen peroxide (b) (usually used as an aqueous solution thereof) and vinyl-based monomer (a) and thereby accelerate the polymerization reaction.

The amphiphilic compound (d) is not especially limited. However, as its examples, there can be cited cyclic ethers such as dioxane, tetrahydrofuran and the like; chain type (acyclic) ethers such as diethyl ether, diisopropyl ether, di-n-propyl ether and the like; ethylene glycol diethers such as ethylene glycol diethyl ether and the like; ketones such as acetone, methyl ethyl ketone, methyl isobutyl ketone and the like; amides such as dimethylformamide, ring-opened polymers of oxazoline, and the like; sulfoxides such as dimethyl sulfoxide and the like. Among these, preferred are the ethers such as dioxane, ethylene glycol diethyl ether and the like.

The amphiphilic compound (d) may be used either as one kind alone or in combination of two or more kinds.

However, if an ester is used as the amphiphilic compound (d), any good result is not obtained. Therefore, in this invention, the ester is not used as the amphiphilic compound (d).

In addition, as the amphiphilic compound (d), preferred is one that is easily eliminated during a purification process for an aimed polymer. That is, a low molecular weight compound is preferred.

A preferable amount for use of the amphiphilic compound (d) is in a range of 0.1 to 10.0% by weight, more preferably 1.0 to 5.0% by weight, based on the amount of whole components.

Moreover, in a case of using both of the hydrogen peroxide-decomposing accelerator (c) and the amphiphilic compound (d), it is preferable to use the (c) and (d) in such an amount that, based on the amount of whole components, the (c) is in a range of 0.01 to 20.0% by weight, the (d) is in a range of 0.1 to 10.0% by weight, and a total of the (c) and (d) is in a range of 0.11 to 30.0% by weight.

In a case of using both of the hydrogen peroxide-decomposing accelerator (c) and the amphiphilic compound (d), there is seen an effect that a reaction system becomes more homogeneous and that a number-average molecular weight of a formed polymer A is lower than a case of using the decomposing accelerator (c) alone.

The product ion process of this invention is so arranged that there is not substantially used any component other than the vinyl-based monomer (a), hydrogen peroxide (b), hydrogen peroxide-decomposing accelerator (c) and amphiphilic compound (d).

In practice, a total amount of the component (for example, water, a solvent and the like) other than the vinyl-based monomer (a), hydrogen peroxide (b), hydrogen peroxide-decomposing accelerator (c) and amphiphilic compound (d) is regulated to about 10% by weight or smaller based on the amount of whole components. A preferable amount of the component other than the (a), (b), (c) and (d) is 5% by weight or smaller and the most preferable one is no inclusion of the component other than the (a), (b), (c) and (d).

A vessel for polymerization (a reactor in which a polymerization reaction is performed) used in this invention may be a batch type such as a conventional tank type reactor, kneader and the like. Also, a piston-flow tube type and, depending upon viscosity of a polymer, a continuous type such as a twin screw extruder, a continuous type kneader and the like may be used. Also, a semi-batch type reactor can be used with no problem at all, however, a tube type reactor, an extruder, a continuous type kneader and the like are preferably used from standpoints that the concentration ratios of each additive in a reactor can be easily controlled by adding the additive anywhere on the way of a tube, that the residence time is constant, and that the productivity is excellent. Concerning proper use of the tube type reactor, extruder and continuous type kneader, the tube type reactor is preferably used in a case where viscosity is low after completion of the polymerization, and the extruder or continuous type kneader is preferably used in a case where viscosity is relatively high after completion of the polymerization.

Structure of the tube type reactor has no special limitation, and any tube type reactor hitherto-known in public such as a single tube type, a multi-tube type, mixers of no mobile (made by Noritake Co., Ltd., Sumitomo Jyukikai Kogyo Co., Ltd. and other companies) and the like can be used, however, it is preferable to use a tube type reactor in which a mixer of no mobile is used, from standpoints of mixing and heat exchange efficiency. Similarly, concerning the extruder and continuous kneader, any extruder hitherto-known in public of a single screw type and twin screw type can be used, however, an extruder of a twin screw type and a continuous kneader are preferably used from standpoints of mixing and heat exchange efficiency.

However, for a part of these apparatuses, which comes in contact with a liquid, there should be selected appropriate quality of materials and, generally, as the materials there can be cited SUS 316, 304 L, Teflon, aluminum, glass and the like. Among these, preferable ones are Teflon, aluminum and glass, and the most preferable ones are Teflon and glass. In addition, even other quality of materials can be used similarly to Teflon and glass by subjecting the materials to a proper treatment.

In this invention, it is possible to perform the reaction under normal pressure as well as an increased pressure in an autoclave, an extruder or the like.

Polymerization temperature in the production process of this invention has no especial limitation and there is no problem at all if the temperature is in a range of about from room temperature to 200° C., in which a usual radical polymerization reaction is performed.

The molecular weight of the polymer A produced by this invention is not especially limited, however, it is preferable that the number-average molecular weight is in a range of from 500 to 100,000 in order to display the feature resulting from having a reactive hydroxyl group at a terminal, and it is more preferable that the number-average molecular weight is in a range of from 1,000 to 50,000.

The average number (Fn(OH)) of terminal hydroxyl groups of the polymer A produced by this invention is ideally 2.0, however, if it is in a range of 1.8 to 2.0, physical properties almost similar to ideal ones can be very preferably displayed. If the Fn(OH) is at least 1.5, physical properties close to fairly ideal ones can be displayed. For the reason like this, a preferable average number (Fn(OH)) of terminal hydroxyl groups of the polymer A to produce by this invention is 1.5 or more.

The polymer A produced by the production process of this invention is able to readily convert a hydroxyl group at the terminal, by using an organic reaction and the like hitherto-known in public, into a useful terminal functional group such as a polymerizable unsaturated group like a vinyl group etc., a carboxyl group, an amino group, an epoxy group, a silanol group, an alkoxysilyl group, a hydrosilyl group, a mercapto group, an oxazoline group, a lactone group, an azlactone group, an ethynyl group, a maleimide group, a formyl group, bromine, chlorine and the like.

Next, a composition containing as an essential component the polymer A produced by this invention is explained.

This composition is such as containing the polymer A as well as a compound (z) having two or more of a functional group capable of reacting with a hydroxyl group per one molecule as essential components. The polymer A may be used either as one kind alone or in combination of two or more kinds. Also, a weight ratio between the polymer A and the compound (z) contained in this composition (polymer A/compound (z)) is not especially limited, however, a preferable ratio is in a range of from 99.99/0.01 to 40/60 and more preferable one is in a range of from 99.9/0.1 to 60/40.

This composition, in addition to the polymer A, may contain a low molecular weight compound having a hydroxyl group hitherto-known in public or a polymer having a hydroxyl group hitherto-known in public (a polymer polyol, an acrylic polyol, a polyether polyol, a polyester polyol, a polycarbonate polyol, a polybutadiene polyol, a polyolefine polyol and the like).

The compound (z) having two or more of a functional group capable of reacting with a hydroxyl group per one molecule is not especially limited, however, there are cited, for example, a compound (e) having two or more of an isocyanate group per one molecule; an amino plastoresin (f) such as methylolated melamines, alkyl ether derivatives of the melamines, low-condensation compounds of the melamines (the term "low-condensation compound(s)" used herein is employed to mean "compounds made by comprising several, not many repeats of condensation reaction(s)"), and the like; a compound (g) having two or more of a carboxyl group per one molecule such as a polyfunctional carboxylic acid and halides thereof and the like; and the like.

The compound (e) having two or more of an isocyanate group per one molecule is a so-called polyfunctional isocyanate compound. Any one of the polyfunctional isocyanate compounds hitherto-known in public can be used. There are cited, for example, isocyanate compounds such as tolylene diisocyanate (which may be said as "TDI"), diphenylmethane 4,4'-diisocyanate (which may be said as "MDI"), hexamethylene diisocyanate, xylylene diisocyanate, m-xylylene diisocyanate, naphthalene 1,5-diisocyanate, hydrogenated diphenylmethane diisocyanate, hydrogenated tolylene diisocyanate, hydrogenated xylylene diisocyanate, isophorone diisocyanate and the like; buret polyisocyanate compounds such as Sumidur N (made by Sumitomo-Bayer Urethane Co., Ltd.); polyisocyanate compounds having an isocyanurate ring such as Desmodur IL, HL (made by Bayer A.G.) and Colonate EH (made by Nippon Polyurethane Kogyo Co., Ltd.); adduct polyisocyanate compounds such as Sumidur L (made by Sumitomo-Bayer Urethane Co., Ltd.), adduct polyisocyanate compounds such as Colonate HL (made by Nippon Polyurethane Kogyo Co., Ltd.); and the like. These may be used either alone or in combination of two or more kinds. Also, a block isocyanate may be used.

In order to utilize superior weather resistance of a composition made by containing the polymer A and a polyfunctional isocyanate compound (e), preferable examples of the polyfunctional isocyanate compound (e) are isocyanate compounds not having an aromatic ring such as hexamethylene diisocyanate, hydrogenated diphenylmethane diisocyanate, Sumidur N (made by Sumitomo-Bayer Urethane Co., Ltd.) and the like.

The formulating ratio between the polymer A and the polyfunctional isocyanate compound (e) is not especially limited, however, for example, it is preferable that a ratio between the isocyanate group of compound (e) and the hydroxyl group of polymer A (NCO/OH (mole ratio)) is in a range of from 0.1 to 1.0, and more preferable that the ratio is in a range of from 0.8 to 1.2. Moreover, in a case of using this composition for a use demanding superior weather resistance, the composition may be used in a mole ratio NCO/OH increased up to about 3.0.

Furthermore, in order to accelerate a conversion reaction into an urethan between the polymer A and the polyfunctional isocyanate compound (e) which are components in the composition, as occasion demands, a catalyst known in public such as an organic tin compound, a tertiary amine and the like is freely used.

The amino plastoresin (f) is not especially limited, however, there are cited, for example, a reaction product (a methylolated compound) between a triazine ring-containing compound shown by the below-mentioned general formula (I) and formaldehyde, a low-condensation compound between the triazine ring-containing compound and formaldehyde, and derivatives thereof, and furthermore, an urea resin, a reaction product (a methylolated compound) between the urea resin and formaldehyde, a low-condensation compound between the urea resin and formaldehyde, derivatives thereof and the like.

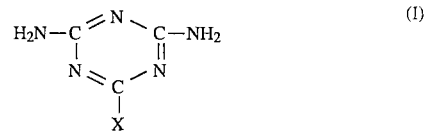
(I)

The triazine ring-containing compound shown by the above general formula (I) is not especially limited, however, there can be cited, for example, melamine, benzoguanamine, cyclohexanecarboguanamine, methylguanamine, vinylguanamine and the like. These may be used either as one kind alone or in combination of two or more kinds.

The reaction product between the aforementioned triazine ring-containing compound and formaldehyde and derivatives thereof are not especially limited, however, there are cited, for example, hexamethoxymethylmelamine, tetramethoxymethylbenzoguanamine and the like. Furthermore, the low-condensation compound between the aforementioned triazine ring-containing compound and formaldehyde and derivatives thereof are not especially limited, however, there are cited, for example, a low-condensation compound in which several of the aforementioned triazine ring-containing compound are combined through either one or both of the —NH—CH$_2$—O—CH$_2$—NH— bond and the —NH—CH$_2$—NH— bond, an alkyletherated formaldehyde resin (Cymel, made by Mitsui Cyanamide Co., Ltd.) and the like. These amino plastoresins (f) may be used either as one kind alone or in combination of two or more kinds.

A ratio between the aforementioned triazine ring-containing compound and formaldehyde, which are used in synthesizing the amino plastoresin (f) exemplified before, differs depending upon the use, however, a preferable mole ratio between the triazine ring-containing compound and formaldehyde (triazine ring-containing compound/formaldehyde) is in a range of from 1 to 6 and more preferable one is in a range of from 1.5 to 4.

In a composition containing, as essential components, the polymer A and the amino plastoresin (f) as the compound (z), a preferable ratio (weight ratio) between the polymer A and amino plastoresin (f) is in a range of from 95:5 to 50:50 and more preferable one is in a range of from 80:20 to 60:40.

In the composition containing the polymer A and amino plastoresin (f) as essential components, in order to accelerate a reaction, a catalyst hitherto-known in public such as p-toluenesulfonic acid, benzenesulfonic acid and the like is freely usable.

The compound (g) having two or more of a carboxyl group per one molecule is not especially limited, however, there are cited, for example, a polyfunctional carboxylic acid and anhydride thereof, such as oxalic acid, malonic acid, succinic acid, glutaric acid, adipic acid, phthalic acid, phthalic anhydride, terephthalic acid, trimellitic acid, trimellitic anhydride, pyromellitic acid, pyromellitic anhydride, maleic acid, maleic anhydride, fumaric acid, itaconic acid, diphenic acid, naphthalenedicarboxylic acid and the like, halides of these compounds, a polymer having plural carboxyl groups, and the like. The compound (g) may be used as one kind alone or in combination of two or more kinds. A preferable ratio by mole of the compound (g) to hydroxyl groups contained in polymer A (compound (g)/hydroxyl groups in polymer A) is in a range of from 1 to 3 and more preferable one is in a range of from 1 to 2.

When a composition containing as essential components the polymer A and a compound (z) having two or more of a functional group capable of reacting with a hydroxyl group per one molecule (hereinafter, this composition may simply be referred to as "composition A") is used as a composition for coating, because the hardness of coating is required, it is necessary to have a certain degree of crosslinking density. Therefore, a preferable example of the polymer A in using for coating is such as having a hydroxyl group value in a range of from about 10 to 300. That is, in a case where the polymer does not comprise copolymerizing a momoner having a hydroxyl group, a preferable number-average molecular weight of the polymer A is in a range of from about 500 to 12,000. However, even such as having the number-average molecular weight of 12,000 or more can be used by copolymerizing a momomer having a hydroxyl group. In addition, in a case of using this composition as a composition for coating, a preferable Tg (glass transition temperature) of the polymer A is in a range of from −30° to 100° C. and a more preferable Tg is in a range of from −10° to 60° C. A polymer A having a desirable Tg can be synthesized by controlling the kind and proportion of a using vinyl-based monomer (b). In addition, in a case where an amino plastoresin (f) is used, it is preferred to copolymerize a vinyl-based monomer having an acid group as an inner acid catalyst.

In a case where the composition A is used as a composition for coating, in addition to the polymer A, a low molecular weight compound having a hydroxyl group hitherto-known in public, a polymer having a hydroxyl group hitherto-known in public (polymer polyol, acryl polyol, polyether polyol, polyester polyol, polycarbonate polyol, polybutadiene polyol, polyolefin polyol and the like), and a resin for coating hitherto-known in public and so forth may be contained.

In a case where the composition A is used as a composition for a pressure sensitive adhesive, a preferable Tg of the polymer A is −20° C. or lower, and its preferable molecular weight (weight-average molecular weight) is in a range of from 1,000 to 1,000,000. In a case where a polymer A having a low weight-average molecular weight of about 1,000 to 10,000 is coated to a base material and then chain-elongated to use as a pressure sensitive adhesive in combination with a difunctional isocyanate compound and the like, viscosity of the pressure sensitive adhesive composition is lower than a case of using a conventional polymer obtained by copolymerizing a vinyl-based monomer having a functional group (as usual, a polymer having a weight-average molecular weight of 100,000 or higher is used) and, because of this, there is obtained effects that the amount for use of a solvent can be reduced and that working performance is improved, which was not obtained by a conventional pressure sensitive adhesive composition. Also, to further elevate the tackiness to a base material, it is preferable to copolymerize a monomer having an acid group.

In a case where the composition A is used as a composition for a pressure-sensitive adhesive, if required, an additive such as a tackifier, a plasticizer, filler, an antioxidant and so forth may be contained. An usable tackifier is not especially limited, however, preferable ones are, for example, a rosin type, rosin ester type, polyterpine resin, chroman-indene resin, petroleum-based resin, terpine-phenol resin and the like. The plasticizer is not especially limited, however, preferable ones are, for example, a liquid type polybutene, mineral oil, lanolin, liquid type polyisoprene, liquid type polyacrylate and the like. The filler is not especially limited, however, preferable ones are, for example, zinc white, titanium white, calcium carbonate, clay, various kinds of pigments and so forth. The antioxidant is not especially limited, however, preferable ones are, for example, a rubber-based antioxidant (a phenol type and an amine type), metal dithiocarbamate and so forth. Each of the aforementioned tackifier, plasticizer, filler and antioxidant may be used in one kind or in combination of two or more kinds.

In a case where the composition A is used as a composition for an adhesive, a preferable molecular weight (weight-average molecular weight) of the polymer A is in a range of from 1,000 to 1,000,000. This polymer can be used, by combining with an isocyanate compound hitherto-known in public, as an one-solution type or a two-solution type adhesive.

In a case where the composition A is used as a composition for an adhesive, if necessary, there may be contained an additive hitherto known in public, such as polyols (polyols of low molecular weight and polyols of high molecular weight), a tackifier, a coupling agent, a thixotropic agent, an inorganic filler, a stabilizer and the like. An usable polyol is not especially limited, however, preferable ones of low molecular weight are, for example, ethylene glycol (which may be said as EG), diethylene glycol (which may be said as DPG), dipropylene glycol (which may be said as DPG), 1,4-butanediol (which may be said as 1,4-BD), 1,6-hexanediol (which may be said as 1,6-HD), neopentyl glycol (which may be said as NPG), trimethylolpropane (which may be said as TMP), and preferable ones of high molecular weight are, for example, polyether polyols (polyethylene glycol)(which may be said as PEG), polypropylene glycol (which may be said as PPG), an ethylene oxide/propylene oxide copolymer (which may be said as EO/PO copolymer), a polytetramethylene glycol (which may be said as PTMEG), polyester polyol, castor oil, a liquid type polybutadiene, an epoxy resin, a polycarbonate diol, a polymer polyol, a polyolefin polyol, an acryl polyol and so forth. The tackifier is not especially limited, however, preferable ones are, for example, a terpine resin, phenol resin, terpine-phenol resin, rosin resin, xylene resin and the like. The coupling agent is not especially limited, however, preferable ones are, for example, a silan coupling agent, a titanium coupling agent and the like. The inorganic filler is not especially limited, however, preferable ones are, for example, carbon black, titanium white, calcium carbonate, clay and the like. The thixotropic agent is not especially limited, however, preferable ones are, for example, aerosol, disperone and so forth. The stabilizer is not especially limited, however, preferable ones are, for example, an ultraviolet radiation absorbent, oxidation inhibitor, a heat-resistant stabilizer, a hydrolysis-resistant stabilizer and the like. The aforementioned polyols, tackifiers, coupling agents, thixotropic agents, inorganic fillers and stabilizers: each of these may be used in one kind or in combination of two or more kinds.

Although the use of aforementioned adhesives is not especially limited, for example, there are an adhesive for packing foods and those for shoe and footwear, for dressing and toilets, for lumber, and for structuring (automobiles, sewage disposal facilities and houses) as well as binders for a magnetic tape and fiber-processing, a fiber-processing agent and so forth.

In a case where the composition A is used as a polyurethane foam composition, as occasion demands, the following compounds hitherto-known in public may be contained, that are polyols (which are polyols of low molecular weight, polyols of high molecular weight and the like other than the polymer/t obtained from the production process of present invention), a polyisocyanate (for example, TDI, MDI and the like), a catalyst (for example, an amine-based, a tin-based and the like), water, a surfactant (for example, a silicon-based, nonionic type, anionic type and so forth), an additive (for example, a fire retardant, an antimicroorganismic agent, a colorant, filler, stabilizer and so forth), a foaming auxiliary agent (for example, halogenated hydrocarbon and the like) and so forth.

In a case where the composition A is used as a sealant composition, a preferable molecular weight (weight-average molecular weight) of the polymer A is in a range of from 1,000 to 1,000,000.

In a case where the composition A is used as a composition for a sealing compound, as occasion demands, the following compounds hitherto-known in public may be contained, which are polyols (polyols of high molecular weight and the like other than the polymer A), a polyisocyanate (for example, TDI, MDI and the like), a catalyst (for example, an amine-based, a tin-based, lead-based and the like), an inorganic filler (for example, calcium carbonate, talc, clay, silica, carbon black, titanium white and so forth), a plasticizer (for example, dioctyl phthalate (which may be said as DOP), di-i-decyl phthalate (which may be said as DIDP), dioctyl adipinate (which may be said as DOA) and the like), an antisagging agent (for example, colloid type silica, hydrated castor oil, organic bentonite, surface-processed calcium carbonate and so forth), an antiaging agent (for example, hindered phenols, benzotriazols, hindered amines and the like), a foaming inhibitor (for example, a dehydrating agent, carbon dioxide absorbent and the like) and so forth.

If a polymer obtained by converting the hydroxyl groups of a polymer A, obtained from the production process of this invention, into a hydroxysilyl, an alkoxysilyl, or a mercapto group is used as an essential component in a sealant composition, the sealant composition becomes a sealant composition having a crosslinking system different from the urethane system.

Next, there is explained a polymer having a polymerizable unsaturated group at both terminals (hereinafter, this polymer may be referred to as "polymer B") obtained from a reaction of the polymer A which was produced by the production process relating to this invention, with a compound (h) having two kinds of reactive groups together in one molecule, one of which is a functional group capable of reacting with a hydroxyl group and the other of which is a polymerizable unsaturated group.

When the polymer B is synthesized, the compound (h) led to a reaction with the polymer A is not especially limited, however, a preferable one is, for example, a vinyl-based monomer having an isocyanate group, a carboxyl group, a methylolated triazine ring and the like. More practically, the examples are methacryloyloxyethyl isocyanate, methacryloyl isocyanate, isopropenyldimethylbenzyl isocyanate, (meth)acrylic acid, maleic acid, maleic anhydride, fumaric acid, itaconic acid, itaconic anhydride, and halogenides of these carboxyl groups, and a methylolated compound of vinylguanamine and the like.

Also, in this reaction, it is free to use a solvent or a catalyst hitherto-known in public. Preferable examples of this catalyst, in the case where the functional group which the compound (h) has is an isocyanate group, are tertiary amines such as triethylamine and the like and tin compounds such as dibutyltin dilaurate and the like. The preferable examples, in the case where said functional group is a carboxyl or an acid anhydride group, are amine compounds such as triethylamine, pyridine and the like, inorganic acids such as sulfuric acid, alkali metal salts of organic acids and the like. The preferable examples, in the case where said functional group is a methylolated compound of a triazine ring, are sulfonic acids such as dodecylbenzenesulfonic acid and the like, and other weak acids and the like.

In a case where the polymer B is used as an essential component of a composition, an example of the other component contained in this composition is a vinyl-based monomer having one polymerizable unsaturated group per one molecule and the like. This vinyl-based monomer is not especially limited, and any monomer hitherto-known in public can be used with no problem. For example, the vinyl-based monomers (a) used in producing the polymer A having a hydroxyl group at both terminals can be all used and, especially, styrene, an acrylic acid ester, a methacrylic acid ester and the like are preferable. In the above-mentioned composition, if required, a polymerization initiator hitherto-known in public may be contained. Although the energy source to initiate the polymerization reaction is not especially limited, for example, light, EB, UV, radiation, heat and so forth can be used.

Examples of the composition, which contains as essential components the polymer B and a vinyl-based monomer having one polymerizable unsaturated group in one molecule, are a gel coat resin composition and a resin composition for artificial marble, which are illustrated below in detail.

The gel coat resin composition, as occasion demands, may contain a polyfunctional vinyl-based monomer having two or more of a polymerizable unsaturated group per one molecule. Examples of this polyfunctional vinyl-based monomer are ethylene glycol di(meth)acrylate, diethylene glycol di(meth)acrylate, triethylene glycol (meth)acrylate, propylene glycol di(meth)acrylate, methylenebisacrylamide, 1,6-hexanediol di(meth)acrylate, trimethylolpropane tri(meth)acrylate, pentaerythritol tri(meth)acrylate, pentaerythritol tetra(meth)acrylate, dipentaerythritol tetra(meth)acrylate, dipentaerythritol hexa(meth)acrylate and the like. These compounds can be used alone or in combination of two or more kinds.

The weight ratio (polymer B/vinyl-based monomer) between the polymer B and the vinyl-based monomer, both of which are contained in the gel coat resin composition, is not especially limited, but a preferable ratio is in a range of from 10/90 to 60/40 and a more preferable one is in a range of from 20/80 to 50/50. If the ratio is smaller than 10/90, since reaction contraction of the gel coat resin layer is too large, contraction strain becomes large and a superior coat surface is hard to obtain. Also, if the ratio is larger than 60/40, viscosity of the gel coat resin composition becomes too high and extreme dropping of working efficiency is apt to occur.

In order to obtain the surface hardness of a gel coat layer, it is preferable that Tg of a polymer B and Tg of a vinyl-based monomer used in the present use are both 20° C. or more. Also, in a case where it is necessary to raise crosslinking density in order to get the surface hardness, it is preferable to copolymerize a monomer having a hydroxyl group in the polymer A which is precursor of the polymer B or to use the polyfunctional vinyl-based monomer in a proportion of 50 weight % or less.

Into the gel coat resin composition, as occasion demands, a polymerization inhibitor such as hydroquinone, catechol, 2,6-di-tertiary-butyl-p-cresol and the like is added, and then, said composition is hardened by a radical-polymerization initiator generally used as usual, especially by an organic peroxide initiator and the like. In using the organic peroxide initiator, a curing accelerator may be jointly used, and its examples are various kinds of reductive metal compounds such as cobalt naphthenic acid, nickel naphthenic acid, iron naphthenic acid and the like, and reductive compounds such as amines and mercaptanes.

To the gel coat resin composition, as occasion demands, various kinds of additives such as thixotropic agents hitherto-known in public such as silica, asbestos powder, hydrogenated castor oil, a fatty acid amide and so forth, and a filler, stabilizer, deforming agent, leveling agent and so forth can be combined as others than a dye, plasticizer, an ultraviolet radiation absorbent and so forth.

Into the resin composition for artificial marble, as occasion demands, are freely added the polyfunctional vinyl-based monomer having two or more of a polymerizable unsaturated group per one molecule and additives such as a filler, hardening agent, thermoplastic polymer and the like.

Although the polyfunctional vinyl-based monomer added in case of need into a resin composition for artificial marble is not especially limited, for examples, all the polyfunctional vinyl-based monomers which may be contained in the foregoing gel coat resin composition can be used. The adding amount of the polyfunctional vinyl-based monomer is not especially limited, however, the preferable amount is 40 weight % or less against a total amount of the polymer B, the vinyl-based monomer having one polymerizable unsaturated group per one molecule, and the polyfunctional vinyl-based monomer. If the adding amount of the polyfunctional vinyl-based monomer exceeds 40 weight %, the obtained artificial marble becomes hard and fragile, so that this is a undesirable matter.

Preferable fillers which are, in case of need, added into the resin composition for artificial marble are aluminum hydroxide, magnesium hydroxide, calcium hydroxide, calcium carbonate, talc, clay, silica, quartz, alumina, zirconia, glass powder, glass fiber; natural crushed stones such as marble, limestone, pyroxene, amphibole, sandstone, granite, basalt and the like; crushed matters of synthetic resins such as a unsaturated polyester resin, thermosetting acrylic resin, melamine resin and the like. The adding amount of the fillers is not especially limited, but a preferable one is in a range of from 100 to 800 weight % to a total amount of the polymer B, the vinyl-based monomer having one polymerizable unsaturated group per one molecule and the polyfunctional vinyl-based monomer. If the adding amount is less than 100 weight %, there exists a case where heat resistance and fire retardation are not enough, and if it exceeds 800 weight %, dispersion of the filler into the polymer B, the vinyl-based monomer having one polymerizable unsaturated group per one molecule and the polyfunctional vinyl-based monomer may become insufficient and homogeneous artificial marble may not be obtained because of fluidity loss in the course of molding and hardening.

The hardening agent which is, in case of need, added into the resin composition for artificial marble is not especially limited, but preferable examples of the agent are benzoyl peroxide, cyclohexanone peroxide, methyl ethyl ketone peroxide, bis(4-tertiary-butylcyclohexyl) peroxydicarbonate, tertiary-butyl peroxybenzoate, tertiary-butyl peroxyoctate and the like. Among these compounds, preferable one for press molding is tertiary-butyl peroxyoctate or benzoyl peroxide, which give a hardened product not forming cracks with good transparency and which are hardening agents used at a moderately high or a high temperature. Although the hardening agents used at a moderately high or a low temperature are used alone or with an organic amine or a salt of polyvalent metals in combining with a curing accelerator, a preferable agent for casting is bis(4-tertiary-butylcyclohexyl) peroxydicarbonate (Perkadox PX-16, made by Nihon Kayaku Co., Ltd.).

The thermoplastic polymer which is, in case of need, added into the resin composition for artificial marble is not especially limited, but examples of the polymer are (meth)acryl-based polymers such as polymethylmethacrylate and the like; polymers of a low extent of contraction hitherto-known in public such as a (meth)acrylate-styrene copolymer, polystyrene, polyvinyl acetate, a styrene-vinyl acetate copolymer, polyvinyl chloride, polybutadiene, polyethylene, polycaprolactam, saturated polyester and the like. These compounds are used alone or in joint use. However, if the polymer of a low extent of contraction is combined in a large amount, viscosity-rise in the course of kneading occurs, so that a formulated matter for casting having a high filler content is hard to obtain and a product inferior in transparency and heat resistance may be only obtained. Therefore, it is preferred to use the thermoplastic polymer of a low extent of contraction in an amount as small as possible, and a preferable amount for use is not especially limited, but it is in a range of 100 weight % or less against a total amount of the polymer B, the vinyl-based monomer having one polymerizable unsaturated group per one molecule and the vinyl-based monomer.

Next, there is explained a polymer C having a carboxyl group at both terminals obtained from a reaction of the polymer A, which was produced by the production process of this invention, with an acid anhydride and/or a compound (i) having two reactive groups together in one molecule, one of which is a functional group capable of reacting with a hydroxyl group and the other of which is a carboxyl group.

In synthesizing this polymer C, the compound (i) led to a reaction with the polymer A having hydroxyl groups is not especially limited, but its examples are dibasic acids such as oxalic acid, malonic acid, succinic acid, glutaric acid, adipic acid, pimelic acid, suberic acid, azelaic acid, sebacic acid, dodecane diacid, phthalic acid, terephthalic acid, maleic acid, fumaric acid, itaconic acid and the like; and halogen-substituted carboxylic acids such as chloroacetic acid, bromoacetic acid and the like. Like the above-mentioned, the two reactive groups contained in the compound (i), one of which is a functional group capable of reacting with a hydroxyl group and the other of which is a carboxyl group, may be two carboxyl groups or combination of a functional group other than the carboxyl group such as a halogeno group and the like with a carboxyl group. Instead of the compound (i), an acid anhydride may be used or the compound (i) and an acid anhydride may be jointly used. The acid anhydride is not especially limited and preferable one for example, succinic anhydride, glutaric anhydride, phthalic anhydride, maleic anhydride, itaconic anhydride and the like.

In a reaction of the polymer A having a hydroxyl group at both terminals with either or both of the compound (i) and an acid anhydride, a solvent or a catalyst hitherto-known in public are freely used. In a case where the functional group which is contained in the compound (i) and capable of reacting with a hydroxyl group is a carboxyl group, preferable examples of the catalyst are an inorganic acid such as sulfuric acid, hydrochloric acid and the like; an inorganic base such as sodium hydroxide, potassium hydroxide and the like; a tertiary amine compound such as triethylamine, pyridine and the like; an organic acid salt such as sodium acetate, potassium acetate and the like. In a case where the compound (i) has a halogen group, the examples a tertiary amine compounds such as pyridine, triethylamine and the like.

The reaction temperature in the case where the polymer A is allowed to react with an acid anhydride is not especially limited, but preferable one is in a range of from 60° to 100° C. If the temperature is lower than 60° C., the reaction rate is slow and the final exchange percentage is low. If i t exceeds 100° C., the reaction rate of a dibasic acid becomes high, but there occurs a problem that the forming amount of a diester increases and the molecular weight of after reaction also increases.

Next, there is explained a resin composition which shows a feature of containing, as essential components, the polymer C having a carboxyl group at both terminals and the compound (j) having two or more of a functional group capable of reacting with a carboxyl group per one molecule.

The polymer C having carboxyl groups may be used alone or in combination of two or more kinds. Also, the weight ratio between the polymer C and the compound (j) contained in this resin composition (polymer C/ the compound (j)) is not especially limited, but preferable one is in a range of from 99.99/0.01 to 40/60 and more preferable one is in a range of from 99.9/0.1 to 60/40.

The compound (j) having two or more of a functional group capable of reacting with a carboxyl group per one molecule is not especially limited, but its preferable examples are a compound having two or more of an epoxy group per one molecule, a compound having two or more of a hydroxyl group per one molecule, a compound having two or more of an amino group per one molecule, a compound having two or more of a mercapto group per one molecule, a compound having two or more of a halogeno group per one molecule, a compound having two or more of an oxazoline group per one molecule, a compound having two or more of an aziridine group per one molecule, a compound having two or more of an ester group per one molecule, a compound having two or more of a carboxyl group per one molecule and the like.

The polymer C may be used as an essential component of the epoxy resin composition. The epoxy resin, which is another essential component contained in the epoxy resin composition like the above, is not especially limited as far as it is an epoxy resin hitherto-known in public, and its preferable examples are glycidyl ethers of the phenols such as bisphenol A, bisphenol F, phenol novolac, cresol novolac, brominated bisphenol A and the like; glycidyl ethers of the alcohols such as butanol, butanediol, polyethylene glycol, polypropylene glycol and the like; glycidyl ethers of the acids such as hexahydrophthalic acid, dimer acid and the like. These compounds are used alone or may be used in combination of two kinds or more.

Into the aforementioned epoxy resin compounds, as occasion demands, an additive such as a filler, pigment, hardening agent and so forth is freely added. Preferable examples of the filler are aluminum hydroxide, magnesium hydroxide, calcium hydroxide, calcium carbonate, talc, clay, silica, kaolin, titanium oxide, quartz, quartz glass, alumina, zirconia, glass powder, glass fiber, natural crushed stones such as marble, limestone, pyroxene, amphibole, sandstone, granite, basalt; crushed matters of the synthetic resins such as a unsaturated polyester resin, thermosetting acrylic resin, melamine resin and the like. Preferable examples of the hardening agent are aliphatic amines of straight chain types such as diethylenetriamine, triethylenetetramine, tetraethylenepentamine, diethylaminopropylamine and the like; various polyamides having different amine values; alicyclic amines such as menthenediamine, isophoronediamine, bis(4-aminocyclohexyl)methane and the like; aromatic amines such as m-xylenediamine, diaminodiphenylmethane, diaminodiphenylsulfone, m-phenylenediamine and the like; acid anhydrides such as phthalic anhydride, tetrahydrophthalic anhydride, hexahydrophthalic anhydride, methyltetrahydrophthalic anhydride, methylhexahydrophthalic anhydride, nadic methyl anhydride, dodecylsuccinic anhydride, pyromellitic anhydride, methylcyclohexenetetracarboxylic anhydride, trimellitic anhydride, polyazelaic anhydride and the like; compounds containing a phenolic hydroxyl group such as phenol novolac, cresol novolac and the like; polymercaptanes; anionic polymerization catalysts such as 2,4,6 -tris(dimethylaminomethyl)phenol, 2-ethyl-4-methylimidazole and the like; cationic polymerization catalysts such as a boron trifluoride-monoethylamine complex and the like; potential hardening agents represented by dicyanediamide, an amine adduct, a hydrazide, an amidoamine, a block isocyanate, carbamic acid salt, ketimine, an aromatic diazonium salt and the like. These compounds are used alone or in combination of two kinds or more.

Next, there is explained a polyurethanes obtained from a reaction of a polyol component (k), which contains as an essential component the polymer A obtained by the production process of this invention, with the polyfunctional isocyanate compound (e) having two or more of an isocyanate group per one moleculeare.

The polyfunctional isocyanate compound (e) having two or more of an isocyanate group per one molecule, which is used to synthesize the polyurethane, is as mentioned before. The polyol component (k) containing the polymer A as an essential component may comprise either the polymer A alone (including a case of using two or more kinds of polymers A) or combination of the polymer A with another polyol. Another polyol is not especially limited, but its example is one or two kinds or more selected from the following compounds: polyols of low molecular weight such as ethylene glycol, diethylene glycol, triethylene glycol, propylene glycol, 1,4-butanediol, 1,3-butanediol, 1,6-hexanediol, trimethylolpropane, pentaerythritol, sorbitol and the like; partially esterified products from polyols of low molecular weight, such as sorbitan fatty acid esters; polyether polyols such as polyethylene glycol, polypropylene glycol, a polypropylene glycol-polyethylene glycol block copolymer and the like; polyester polyols synthesized from the aforementioned polyols of low molecular weight with a polyfunctional carboxylic acid such as phthalic acid, phthalic anhydride, terephthalic acid, maleic acid, maleic anhydride, fumaric acid, malonic acid, succinic acid, glutaric acid, adipic acid and the like; polycarbonate polyols; diene-based polyols consisting of butadiene and a butadiene-acrylonitrile copolymer main chain; polyols of high molecular weight such as a polyolefin polyol, an acryl polyol, polymer polyol and the like.

In addition, to synthesize these compounds, a total amount of the polyol component (k) and polyfunctional compound (e) may be allowed to react by one step, or a specific component in the polyol component (k) is allowed to react with the polyfunctional isocyanate compound (e) at the first step to prepare a polymer (oligomer) having at least one isocyanate group at a terminal and then, at the next step, this polymer (oligomer) is allowed to react with another polymer (oligomer) having one hydroxyl group. Such a two-step reaction may be used to synthesize the polyurethane. However, in a case of the two-step reaction, there is a case where it is necessary in the way to remove an isocyanate compound remained after reaction.

In synthesizing this polyurethane, the ratio of amounts for use between the polymer A and the polyfunctional isocyanate compound (e) is not especially limited. For example, in a case of the aforementioned two-step reaction, if the mole ratio between the isocyanate group in the compound (e) and the hydroxyl group in the polymer A (NCO/OH) is higher than 1, there is no problem. However, in order to prevent increase of molecular weight at this stage and synthesize a polyurethane having a definite block structure, a preferable ratio is in a range of from 1.2 to 2.0 and a more preferable one is in a range of from 1.5 to 2.0. Furthermore, in one-step reaction, a preferable mole ratio between the isocyanate group in the polyfunctional isocyanate compound (e) and the hydroxyl group in the polymer A (NCO/OH) is in a range of from 0.5 to 1.5 and a more preferable one is in a range of from 0.8 to 1.2.

In synthesizing the polyurethane, in order to accelerate the reaction to convert in to the urethane, a catalyst known in public such as an organic tin compound or a tertiary amine or various kinds of solvents are freely usable.

Next, there is explained a polyester obtained from a reaction of a polyol component (k), which contains as an essential component the polymer A obtained by the production process of this invention, with the compound (g) having two or more of a carboxyl group per one molecule.

The polyol component (k) containing the polymer A as an essential component used in synthesizing this polyester is the same as that explained in the aforementioned polyurethanes. Also, the compound (g) having two or more of a carboxyl group per one molecule is the same as the aforementioned.

In addition, in synthesizing the aforementioned polyester, in order to accelerate the esterification reaction, a catalyst known in public such as an inorganic acid and the like (for example, sulfuric acid) or various kinds of solvents are freely usable.

In a case where the above-mentioned polyurethane or polyester is used as a molding material, as occasion demands, for example, glass fiber such as contained in a conventional molding material, a filler such as pulp and so forth, a mold-releasing material, calcium carbonate, a pigment such as titanium oxide and the like, an ultraviolet radiation absorbent, an antioxidative material and so forth may be contained as other components in the molding material. As the molding method may be used any molding method hitherto-known in public. Concerning the shape of moldings, various shapes such as a film type, a sheet type and so forth can be made from the molding material.

Next, there is explained a block polymer containing as an essential the polymer A obtained by the production process of the present invention.

The process to obtain this block polymer is not especially limited, however, there are cited, for example, the under-described processes of from ① to ④.

① A process which comprises using two kinds or more of polyols comprising different kinds of polymers A, obtained from the production process of this invention, or combination of the polymer A with another polyol and carrying out a reaction of these polyols with a compound having two or more of a functional group capable of reacting with a hydroxyl group per one molecule.

② A process which comprises carrying out a reaction of the polymer A, obtained from the production process of this invention, with a polymer having only one hydroxyl group per one molecule and a compound having two or more of a functional group capable of reacting with the hydroxyl group per one molecule.

③ A process which comprises carrying out a reaction of the polymer A, obtained from the production process of this invention, with a compound having two or more of a functional group capable of reacting with the hydroxyl group per one molecule.

④ A process which comprises using the polymer A, obtained from the production process of this invention, as an initiator and carrying out a ring-opening polymerization reaction of one kind or two or more kinds of a cyclic ether such as ethylene oxide, propylene oxide, tetrahydrofuran and the like.

In the above-described ①, ② and ③ processes, the functional group capable of reacting with a hydroxyl group is not especially limited, but preferable ones are, for example, an isocyanate group, a carboxyl group, triazine ring, methylolated triazine ring, an acid anhydride group, azlactone ring, a silanol group, carbonate group, an epoxy group, acid halide group and the like.

The reaction procedure in the ①, ② and ③ processes is not especially limited, however, any one of the one-step process and multistep process described in the explanation of aforementioned polyurethanes and polyesters can be used.

The use of this block polymer is not especially limited, however, it is, for example, a surfactant, a compatibilizer, a resin for toner, hot melt adhesive, thermoplastic elastomer, thermosetting elastomer, resin-modifier, pressure sensitive adhesive, disperser, heat-resistant transparent resin, an impact-resistant transparent resin, artificial leather, a synthetic leather, water-reducing agent for cement, an urethane foam and so forth.

The structure of the block polymer is not especially limited, but it is by itself settled according to their use. For example, if the use for a surfactant is explained as an example, it is desirable that the two or more kinds of segments making the block polymer consist of a hydrophilic segment and hydrophobic segment. If the use for an elastomer is explained as an example, it is desirable that the two or more kinds of segments making the block polymer differs by 10° C. or more from each other in glass transition temperature.

The production process of present invention is arranged in such a manner that a polymerization reaction of a vinyl-based monomer (a) is carried out by using either one or both of a hydrogen peroxide-decomposing accelerator (c) and an amphiphilic compound (d) together with hydrogen peroxide (b). In this case, into both terminals of a polymer formed by the polymerization reaction of the vinyl-based monomer (a) there is introduced a hydroxyl group easily and surely with good efficiency. As a result, it becomes possible that a polymer having a hydroxyl group at both terminals is easily obtained with a cheap price and good efficiency from a wide field of vinyl-based monomers including polar vinyl-based monomers.

Although a hydroxyl group cannot be introduced into both terminals of a polymer by using only hydrogen peroxide, sure introduction of hydroxyl group at both the terminals becomes possible by using either one or both of the hydrogen peroxide-decomposing accelerator (c) and the amphiphilic compound (d) together with hydrogen peroxide (b).

Furthermore, the production process of present invention is arranged in such a manner that any component other than the aforementioned (a), (b), (c) and (d) is not substantially used. In practice, the amount of the component other than the (a), (b), (c) and (d) is controlled in an extent of 10% by weight or less of the whole. If the component other than the (a), (b), (c) and (d), for example, water, a solvent and the like, is contained in an extent more than 10% by weight of the whole, polymers not bearing the hydroxyl group at one terminal or both terminals at all are formed as by-products and, as a result, the number of terminal hydroxyl groups in a polymer decreases.

The polymer A obtained by the production process of this invention has transparency, weather resistance, water resistance, hydrolysis resistance and chemical resistance by choosing optionally the sort of the vinyl-based monomer (a) which constitutes a main chain of the polymer A. Furthermore, since various kinds of resins, such as polyester resins, polyurethane resins, polycarbonate resins and the like, and various kinds of block polymers and the like, derived from the composition containing the polymer A, display features of very stretching (excellent bending processibility) and toughness, they are very useful as raw materials for a coating (a high solid coating, a low temperature curable coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curable resin, thermosetting type elastomer, a thermoplastic elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather and the like, and furthermore, very useful as various kinds of resin additives, raw materials therefor and the like.

The polymer A can be easily converted into a polymer having another functional group (for example, a polymerizable unsaturated group, such as a vinyl group and the like, a formyl group, an amino group, a carboxyl group, an ethynyl group, an epoxy group, a silanol group, an alkoxysilyl group, a hydroxysilyl group, a mercapto group, an oxazoline group, a maleimide group, an azlactone group, a lactone group, bromine, chlorine and the like) at both terminals by carrying out a suitable reaction on both the terminal hydroxyl groups of the polymer A. The thus-obtained polymers are also very useful. For example, a polymer having a carboxyl group at both terminals, that is, the polymer C, is very effective as an impact resistance-affording agent for epoxy adhesives and other uses. Furthermore, raw materials for surfactants, urethane foam, a water-reducing cement admixture, a compatibilizer and the like are obtained by adding a plural of ethylene oxide or propylene oxide to the terminal hydroxyl groups of the polymer A.

In a case where a composition containing the polymer A and polyfunctional isocyanate compound (e) as essential components as well as the composition containing the polymer A and amino plastoresin (f) as essential components are used as an essential raw material for a coating respectively, a very excellent paint film can be obtained, which is not only soft and tough, but also superior in weather resistance, water resistance, hydrolysis resistance, chemical resistance, hardness and the like. Furthermore, even if the polymer A is obtained as low molecular weight one, since a hydroxyl group exists at a terminal of the polymer A, the toughness poorness which is a defect of a conventional high solid coating can be improved.

In a case where a composition containing the polymer A and polyfunctional isocyanate compound (e) as essential components is used as a sealant there can be obtained a sealant which is very soft, tough, and superior in weather resistance, water resistance and chemical resistance.

In a case where a composition containing the polymer A and polyfunctional isocyanate compound (e) as essential components is used for the use of urethane foam and thermosetting polyurethane elastomer, there can be obtained a urethane foam and an elastomer which are superior in softness, weather resistance, water resistance, and chemical resistance.

In a case where a composition containing as essential components a vinyl-based monomer having at least one polymerizable unsaturated group per one molecule in addition to the polymer B having polymerizable unsaturated groups, which is obtained from a reaction of the polymer A with the compound (h) having two kinds of reactive groups together in one molecule, that are a polymerizable unsaturated group and a functional group capable of reacting with a hydroxyl group, is used for the use of a gel coat resin composition, there is obtained a gel coat layer which is a little in reaction contraction in the molding course, low in viscosity in the working course with a gel coat resin composition, and further, large in hardness, tough and excellent in weather resistance.

In a case where a polyurethane obtained from a reaction of the polymer A with the polyfunctional isocyanate compound (e), and a polyester obtained from a reaction of the polymer A with the compound (g) having two or more of a carboxyl group per one molecule are, respectively, used as an essential component of a molding material, there can be obtained a molding material which is superior in processing, hydrolysis resistance, weather resistance, chemical resistance and low temperature performance.

BEST MODE FOR CARRYING OUT THE INVENTION

Hereinafter, this invention is illustrated by the following examples of some preferred embodiments in comparison with comparative examples not according to the invention. However, this invention is not limited to the undermentioned examples. Furthermore, in the examples and comparative examples, the units "part(s)" and "%" denote "part(s) by weight" and "% by weight" respectively.

In addition, in the examples and comparative examples, the "polymerization conversion" was a numerical value calculated from a residual ratio of each monomer by gas chromatography after completion of a polymerization reaction, and the "number-average molecular weight (Mn)" was a numerical value determined from a calibration curve based on standard polystyrene by using gel permeation chromatography (GPC). Furthermore, the "average number (Fn(OH)) of terminal hydroxyl groups" was a numerical value which was calculated from both of an OH value (hydroxyl group value), determined according to JIS-K-1557, and the above-measured number-average molecular weight (Mn). In addition, the "gel portion percent" was determined by the following method. A mixture of an obtained polymer and Sumidur N-75 (a trifunctional isocyanate compound made by Sumitomo Bayer Urethane Co., Ltd.) was prepared so as to be 1.1/1 in a mole ratio of an isocyanate group to a hydroxyl group and then, an about 40% toluene solution of this mixture was prepared, to which a slight amount of dibutyltin dilaurate was added as a catalyst. The thus-prepared reaction mixture was, with well stirring, allowed to react at 80° C. for 3 hours to obtain a polyurethane film. Next, after dried sufficiently, the film was treated with a Soxhlet extractor for 8 hours by using tetrahydrofuran as a solvent and a % by weight of the unextracted remaining insoluble portion was shown as the gel portion percent.

EXAMPLE 1

Into a flask equipped with a stirrer, nitrogen-introducing tube, thermometer and reflux condenser were charged 100 parts of butyl acrylate, 11 parts of dodecylbenzenesulfonic acid and 3.9 parts of a 60% aqueous hydrogen peroxide solution. An inside atmosphere of the flask was replaced by a nitrogen gas and then, the temperature was raised up to 140° C. while introducing a nitrogen gas slowly and stirring was continued at the same temperature for 10 minutes to complete a polymerization reaction. The polymerization conversion was determined from a residual ratio of butyl acrylate by gas chromatography, so that it was 96%.

Sequentially, an extracting solvent comprising toluene and water was used and a polymer was separated by extracting it from a reaction mixture containing the polymer, whereby a toluene solution containing the polymer was obtained. Toluene was removed by distillation and, furthermore, the residue was dried at 45° C. under a reduced pressure to obtain a purified polymer (1).

For the purified polymer (1), the number-average molecular weight (Mn) was 13,000 and the average number (Fn(OH)) of terminal hydroxyl groups was 2.0 (mol/polymer 1 mol) and the gel portion percent was 91%.

EXAMPLES 2 and 3

A polymerization reaction was carried out in a manner similar to EXAMPLE 1 except that the kind and ratio of the vinyl-based monomer (a), hydrogen peroxide (b) and hydrogen peroxide-decomposing accelerator (c) were defined as shown in TABLE 1. Sequentially, purified polymers (2) and (3) were obtained by a manner similar to EXAMPLE 1.

For the purified polymers (2) and (3), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 4

Each of hydrogen peroxide (b) and a mixture prepared by mixing a vinyl-based monomer (a) with a hydrogen peroxide-decomposing accelerator (c) in a ratio as shown in TABLE 1 was set in such a manner that the whole amount of the (a), (b) and (c) was continuously supplied at a flow rate of 32 ml per minute using a plunger pump into a tube type reactor which was made by connecting five pieces of a reaction tube (inner diameter of 42.7 mm, length of 450 mm, element number of 12, made by SUS 316, and practical content of 190 ml) equipped with elements of a Sumitomo-Sulzer SMX type (made by Sulzer Co., Ltd.) and an outside jacket. A heating medium was run inside the jacket to stabilize an inner temperature at the polymerization temperature as shown in TABLE 1, whereby a continuous polymerization reaction was carried out. The average residence time was 30 minutes. Then, a polymer (4) was obtained by purifying through a purification process similar to EXAMPLE 1.

For the purified polymer (4), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 5

A twin-screw extruder equipped with an outside jacket (inner diameter=1 inch, L/D=48, barrel number= 8, screw (SACM645), shaft (SNCM439), others (SACM645) ) was furnished with an opening for supplying a raw material and an opening for taking out a product and, in addition to these, another opening for supplying a raw material in the middle of the above openings. Each of hydrogen peroxide (b) and a mixture prepared by mixing a vinyl-based monomer (a) with a hydrogen peroxide-decomposing accelerator (c) in a ratio as shown in TABLE 1 was set in such a manner that the whole amount of the (a), (b) and (c) was continuously supplied into the extruder at a flow rate of 20 ml per minute using a plunger pump. The shape and rotating number of the screw was determined so as to have an average residence time of about 30 minutes at a stationary state, and a heating medium was run in the jacket so as to stabilize the inner temperature at the polymerization temperature as shown in TABLE 1, whereby a continuous polymerization reaction was carried out.

For the resulting purified polymer (5), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 6

A polymerization reaction was carried out in a manner similar to EXAMPLE 1 except that hydrochloric acid was used as a hydrogen peroxide-decomposing accelerator (c). Sequentially, a purified polymer (6) was obtained by a manner similar to EXAMPLE 1.

For the purified polymer (6), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 7

Each of hydrogen peroxide (b) and a mixture prepared by mixing a vinyl-based monomer (a) with a hydrogen peroxide-decomposing accelerator (c) in a ratio as shown in TABLE 2 was set in such a manner that the whole amount of the (a), (b) and (c) was continuously supplied at a flow rate of 32 ml per minute using a plunger pump into a tube type reactor which was made by connecting five pieces of a reaction tube (inner diameter of 42.7 mm, length of 450 mm, element number of 12, made by SUS 316, and practical content of 190 ml) equipped with elements of a Sumitomo-Sulzer SMX type (made by Sulzer Co., Ltd.) and an outside jacket. A heating medium was run inside the jacket to stabilize an inner temperature at the polymerization temperature as shown in TABLE 2, whereby a continuous polymerization reaction was carried out. The average residence time was 30 minutes. Then, a polymer (7) was obtained by purifying through a purification process similar to EXAMPLE 1.

For the purified polymer (7), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 8

A polymerization reaction was carried out in a manner similar to EXAMPLE 1 except that the kind and ratio of the vinyl-based monomer (a), hydrogen peroxide (b) and hydrogen peroxide-decomposing accelerator (c) were defined as shown in TABLE 2. Sequentially, a purified polymer (8) was obtained by a manner similar to EXAMPLE 1.

For the purified polymer (8), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 9

Each of hydrogen peroxide (b) and a mixture prepared by mixing a vinyl-based monomer (a) with a hydrogen peroxide-decomposing accelerator (c) in a ratio as shown in TABLE 2 was set in such a manner that the whole amount of the (a), (b) and (c) was continuously supplied at a flow rate of 32 ml per minute using a plunger pump into a tube type reactor which was made by connecting five pieces of a reaction tube (inner diameter of 42.7 mm, length of 450 mm, element number of 12, made by SUS 316, and practical content of 190 ml) equipped with elements of a Sumitomo-Sulzer SMX type (made by Sulzer Co., Ltd.) and an outside jacket. A heating medium was run inside the jacket to stabilize an inner temperature at the polymerization temperature as shown in TABLE 2, whereby a continuous polymerization reaction was carried out. The average residence time was 30 minutes. Then, a polymer (9) was obtained by purifying through a purification process similar to EXAMPLE 1.

For the purified polymer (9), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLES 10 and 11

A polymerization reaction was carried out in a manner similar to EXAMPLE 1 except that the kind and ratio of the vinyl-based monomer (a), hydrogen peroxide (b) and hydrogen peroxide-decomposing accelerator (c) were defined as shown in TABLES 2 and 3. Sequentially, purified polymers (10) and (11) were obtained by a manner similar to EXAMPLE 1.

For the purified polymers (10) and (11), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 12

A KRC kneader equipped with an outside jacket (inner diameter=2 inches, L/D=13.2, effective inner volume= 1.2 liters, made by Kurimoto Tekkosho Co., Ltd.) was furnished with an opening for supplying a raw material and an opening for taking out a product. Each of hydrogen peroxide (b) and a mixture prepared by mixing a vinyl-based monomer (a) with a hydrogen peroxide-decomposing accelerator (c) in a ratio as shown in TABLE 3 was set in such a manner that the whole amount of the (a), (b) and (c) was continuously supplied at a flow rate of 20 ml per minute using a plunger pump into the kneader. The paddle-rotating number was adjusted at 20 rpm, and a heating medium was run in the jacket so as to have an average residence time of 30 minutes at a stationary state and to stabilize the inner temperature at the polymerization temperature as shown in TABLE 3, whereby a continuous polymerization reaction was carried out.

For the resulting purified polymer (12), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 13

A polymerization reaction was carried out in a manner similar to EXAMPLE 1 except that the kind and ratio of the vinyl-based monomer (a), hydrogen peroxide (b) and amphiphilic compound (d) were defined as shown in TABLE 3. Sequentially, a purified polymer (13) was obtained by a manner similar to EXAMPLE 1.

For the purified polymer (13), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 14

Into a flask equipped with a stirrer, nitrogen-introducing tube, thermometer and reflux condenser were charged 35 parts of butyl acrylate, 1.0 part of dioxane and 5.3 parts of a 60% aqueous hydrogen peroxide solution. An inside atmosphere of the flask was replaced by a nitrogen gas and then, the temperature was raised up to 140° C. while introducing a nitrogen gas slowly and stirring was continued for 60 minutes while carrying out azeotropic dehydration, whereby a polymerization reaction was completed. The polymerization conversion was determined from a residual ratio of butyl acrylate by gas chromatography, so that it was 85%.

Sequentially, an extracting solvent comprising toluene and water was used and a polymer was separated by extracting it from a reaction mixture containing the polymer, whereby a toluene solution containing the polymer was obtained. Toluene was removed by distillation and, furthermore, the residue was dried at 45° C. under a reduced pressure to obtain a purified polymer (14).

For the purified polymer (14), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 15

A polymerization reaction was carried out in a manner similar to EXAMPLE 1 except that the kind and ratio of the vinyl-based monomer (a), hydrogen peroxide (b) and amphiphilic compound (d) were defined as shown in TABLE 4. Sequentially, a purified polymer (15) was obtained by a manner similar to EXAMPLE 1.

For the purified polymer (15), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 1.

EXAMPLE 16

Into a flask equipped with a stirrer, nitrogen-introducing tube, thermometer and reflux condenser were charged 100 parts of butyl acrylate, 1.4 parts of p-toluenesulfonic acid and 3.6 parts of methyl isobutyl ketone. An inside atmosphere of the flask was replaced by a nitrogen gas and then, the temperature was raised up to 140° C. while introducing a nitrogen gas slowly and 3.9 parts of a 60% aqueous hydrogen peroxide solution was added dropwise for 30 minutes. Then ageing was carried out for 5 minutes to complete a polymerization reaction. The polymerization conversion was determined from a residual ratio of butyl acrylate by gas chromatography, so that it was 93%.

Sequentially, an extracting solvent comprising toluene and water was used and a polymer was separated by extracting it from a reaction mixture containing the polymer, whereby a toluene solution containing the polymer was obtained. Toluene was removed by distillation and, furthermore, the residue was dried at 45° C. under a reduced pressure to obtain a purified polymer (16).

For the purified polymer (16), the number-average molecular weight (Mn) was 15,000 and the average number (Fn(OH)) of terminal hydroxyl groups was 2.0 (mol/polymer 1 mol) and the gel portion percent was 94%.

EXAMPLES 17 to 21

A polymerization reaction was carried out in a manner similar to EXAMPLE 16 except that the kind and ratio of the vinyl-based monomer (a), hydrogen peroxide (b), hydrogen peroxide-decomposing accelerator (c) and amphiphilic compound (d) were defined as shown in TABLES 4 and 5. Sequentially, purified polymers (17) to (21) were obtained by a manner similar to EXAMPLE 16.

For the purified polymers (17) to (21), the number-average molecular weight (Mn), average number (Fn(OH)) (mol/polymer 1 mol) of terminal hydroxyl groups, and gel portion percent (%) were determined. Their results were shown in TABLE 6 together with the polymerization conversion determined by a manner similar to EXAMPLE 16.

COMPARATIVE EXAMPLE 1

A polymerization reaction was carried out in a ratio as shown in TABLE 7 in a manner similar to EXAMPLE 1 except that a hydrogen peroxide-decomposing accelerator (c) was not used, whereby a comparative polymer (1) was obtained.

For the obtained comparative polymer (1), the number-average molecular weight, average number (Fn(OH)) of terminal hydroxyl groups, and gel portion percent using the trifunctional isocyanate compound were determined in a manner similar to EXAMPLE 1, so that the number-average molecular weight was 46,000, the average number (Fn(OH)) of terminal hydroxyl groups was 0.9 and the gel portion percent was 27%. These results were shown in TABLE 9 together with the polymerization conversion determined by a manner similar to EXAMPLE 1.

COMPARATIVE EXAMPLE 2

The procedure of EXAMPLE 1 was repeated except that the kind and ratio of the vinyl-based monomer (a), hydrogen peroxide (b) and hydrogen peroxide-decomposing accelerator (c) were defined as shown in TABLE 7 and that 18 parts of toluene was used as a component other than the (a), (b) and (c), that is, a solvent, whereby a comparative polymer (2) was obtained.

For the obtained comparative polymer (2), the number-average molecular weight, average number (Fn(OH)) of terminal hydroxyl groups, and gel portion percent using the trifunctional isocyanate compound were determined in a manner similar to EXAMPLE 1, so that the number-average molecular weight was 16,000, the average number (Fn(OH)) of terminal hydroxyl groups was 0.8 and the gel portion percent was 10%. These results were shown in TABLE 9 together with the polymerization conversion determined by a manner similar to EXAMPLE 1.

COMPARATIVE EXAMPLE 3

The procedure of EXAMPLE 1 was repeated except that the kind and ratio of the vinyl-based monomer (a), hydrogen peroxide (b) and hydrogen peroxide-decomposing accelerator (c) were defined as shown in TABLE 7 and that 19 parts of water was used as a component other than the (a), (b) and (c), that is, a solvent, whereby a comparative polymer (3) was obtained.

For the obtained comparative polymer (3), the number-average molecular weight, average number (Fn(OH)) of terminal hydroxyl groups, and gel portion percent using the trifunctional isocyanate compound were determined in a manner similar to EXAMPLE 1, so that the number-average molecular weight was 49,000, the average number (Fn(OH)) of terminal hydroxyl groups was 0.5 and the gel portion percent was 5%. These results were shown in TABLE 9 together with the polymerization conversion determined by a manner similar to EXAMPLE 1.

COMPARATIVE EXAMPLE 4

A polymerization reaction was carried out in a ratio as shown in TABLE 8 in a manner similar to EXAMPLE 2 except that 1.8 parts of sodium dodecylbenzenesulfonate was used as a hydrogen peroxide-decomposing accelerator (c), whereby a comparative polymer (4) was obtained.

For the obtained comparative polymer (4), the number-average molecular weight, average number (Fn(OH)) of terminal hydroxyl groups, and gel portion percent using the trifunctional isocyanate compound were determined in a manner similar to EXAMPLE 1, so that the number-average molecular weight was 36,000, the average number (Fn(OH)) of terminal hydroxyl groups was 1.2 and the gel portion percent was 48%. These results were shown in TABLE 9 together with the polymerization conversion determined by a manner similar to EXAMPLE 1.

COMPARATIVE EXAMPLES 5 and 6

A polymerization reaction was carried out using a tube type reactor in a ratio as shown in TABLE 8 in a manner similar to EXAMPLE 7 except that dibutylamine or tributylamine was used instead of the hydrogen peroxide-decomposing accelerator (c), whereby comparative polymers (5) and (6) were obtained.

For the obtained comparative polymers (5) and (6), the number-average molecular weight, average number (Fn(OH)) of terminal hydroxyl groups, and gel portion percent using the trifunctional isocyanate compound were determined in a manner similar to EXAMPLE 7, so that, for both the polymers, the number-average molecular weight was about 5,000, the average number (Fn(OH)) of terminal hydroxyl groups was about 1.0 and the gel portion percent was around 10%. These results were shown in TABLE 9 together with the polymerization conversion determined by a manner similar to EXAMPLE 1.

TABLE 1

| EXAMPLE | Vinyl-based monomer (a) Kind | Vinyl-based monomer (a) Amount (parts) | Hydrogen peroxide (b) (60% aqueous solution) Amount (parts) | Hydrogen peroxide-decomposing accelerator (c) Kind | Hydrogen peroxide-decomposing accelerator (c) Amount (parts) | Amphiphilic compound (d) Kind | Amphiphilic compound (d) Amount (parts) | Polymerization apparatus | Polymerization method |
|---|---|---|---|---|---|---|---|---|---|
| 1 | Butyl acrylate | 100 | 3.9 | Dodecylbenzenesulfonic acid | 11 | — | — | Flask batch polymerization | L1 |
| 2 | Ethyl acrylate | 100 | 5.0 | Dodecylbenzenesulfonic acid | 1.8 | — | — | Flask batch polymerization | L1 |
| 3 | Butyl acrylate / Methyl methacrylate | 40 / 60 | 4.6 | Benzenesulfonic acid | 13 | — | — | Flask batch polymerization | L1 |
| 4 | Cyclohexyl methacrylate | 100 | 2.8 | Benzenesulfonic acid | 0.2 | — | — | Tube type reactor | L2 |
| 5 | Methyl methacrylate | 100 | 4.8 | Methanesulfonic acid | 0.5 | — | — | Twin screw extruder | L2 |

L1: Charging a total amount of the (a), (b) and (c) in one lot; 140° C.; 10 minutes.
L2: Continuously supplying the (b) and a mixture of (a) with (c); 140° C.; average residence time 30 minutes.

TABLE 2

| EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Amphiphilic compound (d) Kind | Amount (parts) | Polymerization apparatus | Polymerization method |
|---|---|---|---|---|---|---|---|---|---|
| 6 | Butyl acrylate | 100 | 3.9 | Hydrochloric acid | 0.3 | — | — | Flask batch polymerization | L1 |
| 7 | Styrene | 100 | 4.6 | Sulfuric acid | 0.7 | — | — | Tube type reactor | L2 |
| 8 | Butyl acrylate | 100 | 3.9 | Tetrabutylammonium hydrogen sulfate | 1.4 | — | — | Flask batch polymerization | L3 |
| 9 | Acrylamide Methacrylic acid | 10 90 | 5.7 | Tetrabutylphosphonium bromide | 2.2 | — | — | Tube type reactor | L2 |
| 10 | Methyl methacrylate Acrylic acid Hyroxyethyl methacrylate | 92 3 5 | 4.8 | Trimethylsulfonium boron tetrafluoride | 0.9 | — | — | Flask batch polymerization | L3 |

L1: Charging a total amount of the (a), (b) and (c) in one lot; 140° C.; 10 minutes.
L2: Continuously supplying the (b) and a mixture of (a) with (c); 140° C.; average residence time 30 minutes.
L3: Charging a total amount of the (a), (b) and (c) in one lot; 140° C.; 15 minutes.

TABLE 3

| EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Amphiphilic compound (d) Kind | Amount (parts) | Polymerization apparatus | Polymerization method |
|---|---|---|---|---|---|---|---|---|---|
| 11 | Butyl acrylate | 100 | 3.9 | Pyridine | 0.3 | — | — | Flask batch polymerization | L4 |
| 12 | 2-Ethylhexyl acrylate Styrene Acrylonitrile | 74 24 2 | 3.2 | Carbazole | 0.6 | — | — | KRC neader | L5 |
| 13 | Butyl acrylate | 100 | 3.1 | — | — | Dioxane | 2.9 | Flask batch polymerization | L6 |
| 14 | Butyl acrylate | 100 | 15 | — | — | Dioxane | 2.9 | Flask batch polymerization | L7 |

L4: Charging a total amount of the (a), (b) and (c) in one lot; 140° C.; 30 minutes.
L5: Continuously supplying the (b) and a mixture of (a) with (c); 100° C.; average residence time 30 minutes.
L6: Charging a total amount of the (a), (b) and (d) in one lot; 140° C.; 10 minutes.
L7: Charging a total amount of the (a), (b) and (d) in one lot; 140° C.; under azeotropic dehydration; 60 minutes.

TABLE 4

| EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Amphiphilic compound (d) Kind | Amount (parts) | Polymerization apparatus | Polymerization method |
|---|---|---|---|---|---|---|---|---|---|
| 15 | Butyl acrylate | 100 | 3.9 | Dodecylbenzenesulfonic acid | 1.4 | Dioxane | 3.6 | Flask batch polymerization | L8 |

TABLE 4-continued

| EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Amphiphilic compound (d) Kind | Amount (parts) | Polymerization apparatus | Polymerization method |
|---|---|---|---|---|---|---|---|---|---|
| 16 | Butyl acrylate | 100 | 3.9 | p-Tolunesulfonic acid | 1.4 | Methyl isobutyl ketone | 3.6 | Flask batch polymerization | L9 |
| 17 | Butyl acrylate | 100 | 3.9 | p-Tolunesulfonic acid | 1.4 | Dimethylformamide | 3.6 | Flask batch polymerization | L9 |
| 18 | Butyl acrylate | 100 | 3.9 | p-Tolunesulfonic acid | 1.4 | Ring-opened polymer of ethyloxazoline Molecular weight 50,000 | 0.6 | Flask batch polymerization | L9 |
| 19 | Butyl acrylate | 100 | 3.9 | Hydrochloric acid | 0.3 | Dimethylformamide | 3.6 | Flask batch polymerization | L9 |

L8: Charging a total amount of the (a), (b), (c) and (d) in one lot; 140° C.; 10 minutes.
L9: Charging a total amount of the (a), (c) and (d) in one lot; 140° C.; 35 minutes.

TABLE 5

| EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Amphiphilic compound (d) Kind | Amount (parts) | Polymerization apparatus | Polymerization method |
|---|---|---|---|---|---|---|---|---|---|
| 20 | Butyl acrylate | 100 | 3.9 | Tetrabutylammonium hydrogen sulfate | 1.4 | Dimethylformamide | 3.6 | Flask batch polymerization | L9 |
| 21 | Butyl acrylate | 100 | 3.9 | Pyridine | 0.3 | Dimethylformamide | 3.6 | Flask batch polymerization | L9 |

L9: Charging a total amount of the (a), (c) and (d) in one lot; 140° C.; 35 minutes.

TABLE 6

| EXAMPLE | Polymerization conversion (%) | Number-average molecular weight Mn | Average number of terminal hydroxyl groups Fn (OH) | Gel portion percent (%) | Polymer No. |
|---|---|---|---|---|---|
| 1 | 96 | 13,000 | 2.0 | 91 | (1) |
| 2 | 95 | 25,000 | 2.0 | 90 | (2) |
| 3 | 97 | 15,000 | 2.0 | 85 | (3) |
| 4 | 92 | 31,000 | 1.9 | 96 | (4) |
| 5 | 90 | 36,000 | 1.8 | 81 | (5) |
| 6 | 98 | 6,800 | 2.0 | 92 | (6) |
| 7 | 92 | 35,000 | 1.9 | 94 | (7) |
| 8 | 89 | 14,000 | 1.8 | 89 | (8) |
| 9 | 85 | 59,000 | 1.8 | 91 | (9) |
| 10 | 79 | 42,000 | 1.7 | 92 | (10) |
| 11 | 78 | 14,000 | 2.0 | 85 | (11) |
| 12 | 82 | 48,000 | 1.7 | 83 | (12) |
| 13 | 82 | 88,000 | 1.5 | 80 | (13) |
| 14 | 85 | 11,000 | 1.6 | 82 | (14) |
| 15 | 89 | 11,000 | 2.0 | 90 | (15) |
| 16 | 93 | 15,000 | 2.0 | 94 | (16) |
| 17 | 96 | 9,000 | 1.9 | 87 | (17) |
| 18 | 92 | 36,000 | 1.8 | 85 | (18) |
| 19 | 98 | 8,000 | 1.9 | 90 | (19) |
| 20 | 75 | 17,000 | 1.7 | 92 | (20) |
| 21 | 80 | 10,000 | 2.0 | 87 | (21) |

TABLE 7

| COMPARATIVE EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Solvent or additive Kind | Amount (parts) | Polymerization apparatus | Polymerization method |
|---|---|---|---|---|---|---|---|---|---|
| 1 | Butyl acrylate | 100 | 3.9 | — | — | — | — | Flask batch polymerization | L10 |
| 2 | Butyl acrylate | 100 | 3.9 | Dodecyl-benzene-sulfonic acid | 11 | Toluene | 18 | Flask batch polymerization | L11 |
| 3 | Butyl acrylate | 100 | 3.9 | Tetrabut-ylammonium hydrogen sulfate | 1.4 | Water | 19 | Flask batch polymerization | L12 |

L10: Charging a total amount of the (a) and (b) in one lot; 140° C.; 10 minutes.
L11: Charging a total amount of the (a), (b), (c) and toluene in one lot; 140° C.; 10 minutes.
L12: Charging a total amount of the (a), (b), (c) and water in one lot; 140° C.; 10 minutes.

TABLE 8

| COMPARATIVE EXAMPLE | Vinyl-based monomer (a) Kind | Amount (parts) | Hydrogen peroxide (b) (60% aqueous solution) Amount (parts) | Hydrogen peroxide-decomposing accelerator (c) Kind | Amount (parts) | Solvent or additive Kind | Amount (parts) | Polymerization apparatus | Polymerization method |
|---|---|---|---|---|---|---|---|---|---|
| 4 | Ethyl acrylate | 100 | 5.0 | — | — | Sodium dodecyl-benzene-sulfonate | 1.8 | Flask batch polymerization | L13 |
| 5 | Methyl methacrylate | 100 | 4.8 | — | — | Dibutyl-amine | 0.7 | Tube type reactor | L14 |
| 6 | Styrene | 100 | 4.6 | — | — | Tributyl-amine | 1.0 | Tube type reactor | L14 |

L13: Charging a total amount of the (a), (b) and additive in one lot; 140° C.; 10 minutes.
L14: Continuously supplying the (b) and a mixture of the (a) with the amine; 140° C.; average residence time 30 minutes.

TABLE 9

| COMPARATIVE EXAMPLE | Polymerization conversion (%) | Number-average molecular weight Mn | Average number of terminal hydroxyl groups Fn (OH) | Gel portion percent (%) | Comparative polymer No. |
|---|---|---|---|---|---|
| 1 | 78 | 46,000 | 0.9 | 27 | (1) |
| 2 | 80 | 16,000 | 0.8 | 10 | (2) |
| 3 | 87 | 49,000 | 0.5 | 5 | (3) |
| 4 | 57 | 36,000 | 1.2 | 48 | (4) |
| 5 | 3 | 5,400 | 0.9 | 10 | (5) |
| 6 | 14 | 5,100 | 1.1 | 12 | (6) |

INDUSTRIAL APPLICATION

According to the production process of this invention, a polymer having a hydroxyl group at both terminals (a polymer A) can be surely obtained with ease, a cheap price and good efficiency from a wide field of vinyl-based monomers including polar vinyl-based monomers such as acrylic acid, an acrylic acid ester, methacrylic acid, a methacrylic acid ester and the like.

The polymer A obtained by this production process, because of the presence of a hydroxyl group at both terminals, is in itself very useful as a raw material or an additive for various resins such as a polyester resin, a polyurethane resin, a polycarbonate resin and the like, and furthermore, the polymer itself is very useful for uses such as a coating (a powder coating, a high solid coating, a low temperature curable coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semi-hard, and soft type), urethane RIM, an UV-EB-curable resin, thermosetting type elastomer, thermoplastic elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather and the like. Furthermore, the polymer A can be easily converted into a polymer having a functional group other than a hydroxyl group (for example, a polymerizable unsaturated group, such as a vinyl group and the like, a formyl group, an amino group, a carboxyl group, an ethynyl group, an epoxy group, a silanol group, an alkoxysilyl group, a hydroxysilyl group, a mercapto group, an oxazoline group, a maleimide group, an azlactone group, a lactone group, bromine, chlorine and the like) at both terminals by carrying out a suitable reaction on both the terminal hydroxyl groups of the polymer A. The thus-obtained polymers are also very useful. For example, a polymer having a carboxyl group at both terminals (a polymer C) is very effective as an impact resistance-affording agent for epoxy adhesives. Furthermore, a raw material for surfactants, urethane foam, a water-reducing cement admixture, a compatibilizer and the like is obtained by adding a plural of ethylene oxide or propylene oxide to the terminal hydroxyl groups of the polymer A.

The polymer A obtained by the production process of present invention can be used as a raw material for a thermoplastic water-borne coating since the polymer A can be made into a thermoplastic resin since the polymer A certainly has a hydroxyl group at both terminals. In addition, since the polymer A certainly has a hydroxyl group at both terminals even if its molecular weight is low, the polymer A can be used as a raw material for a water-borne curable coating (for example, a water-borne two-liquid urethane resin-based coating and the like) which is superior in dispersibility and solubility in water and has an excellent physical property of a coating film such as water resistance and the like.

The polymer A can also be used as a raw material for a thermoplastic water-borne adhesive since, as mentioned above, the polymer A can be made into a thermoplastic resin since the polymer A certainly has a hydroxyl group at both terminals. In addition, since the polymer A certainly has a hydroxyl group at both terminals even if its molecular weight is low, the polymer A can be used as a raw material for a water-borne curable adhesive which is superior in dispersibility and solubility in water and has an excellent physical property of an adhesive such as water resistance and the like.

The polymer A is also effective as an additive for improving a bending-processing performance of an epoxy resin-based coating. Especially, the polymer A is very effective as an additive for improving a bending-processing performance of a PCM (pre-coat metal) crosslinking an epoxy resin having a molecular weight of 1,000 to 5,000 with a melamine resin.

When a composition which contains, as essential components, the polymer A, obtained from the production process of this invention, and a polyfunctional compound (z) having two or more of a functional group capable of reacting with a hydroxyl group per one molecule (a composition A) is used as a raw material for various resins such as a polyester resin, a polyurethane resin, a polycarbonate resin and the like, various block polymers, a coating (a powder coating, a high solid coating, a low temperature curable coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curable resin, thermosetting type elastomer, thermoplastic elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather and the like, or used as various resin additives and a raw material therefor and the like, the composition A has soft and tough mechanical properties, and furthermore, it displays excellence sufficiently in properties such as transparency, weather resistance, water resistance, hydrolysis resistance, chemical resistance and the like depending upon the kind of the vinyl-based monomer (a) constituting a main chain of the polymer A.

For example, using the polymer A having a low molecular weight of from about 1,000 to 10,000 in the weight-average molecular weight, and in a case where the polymer is coated on a base material by combining with a two-functional isocyanate compound and the like, then, subjected to a chain-elongation and used as a pressure-sensitive adhesive, compared with a case where a conventional polymer obtained by copolymerizing a vinyl-based monomer having a functional group is used (there is commonly used such as having a weight-average molecular weight of 100,000 or more), the viscosity of a pressure-sensitive adhesive composition is low, and therefore, there is obtained a pressure-sensitive adhesive composition having an epochmaking effect such as decreasing an using amount of a solvent and improving working efficiency which any conventional pressure-sensitive adhesive composition has not yet.

In the case where the foregoing composition A is used as an adhesive composition, because this composition contains the polymer A as one of the essential components, compared with a case where an acrylic-based polymer obtained by copolymerizing a vinyl-based monomer having a functional group is used, viscosity of the adhesive composition is low in a case of exhibiting a similar adhesive performance and, thereby, there are obtained effects such as decreasing an using amount of a solvent and improving working efficiency which any conventional adhesive composition has not yet. Also, an adhesive in which a composition of this invention was used is not only superior in heat resistance in comparison with an adhesive in which a polyether polyol of present use is employed, but also superior in hydrolysis resistance compared with an adhesive in which a polyester polyol of present use is employed.

In the case where the composition A is used as an urethane foam, because the polymer A is used by combining with an isocyanate compound hitherto-known in public and the like, there are obtained effects on softness, weather resistance, heat resistance, water resistance, chemical resistance and impact resilience percentage which have not seen in any conventional urethane foam composition. Also, the urethane foam in which the composition A was used is superior in heat resistance compared with the urethane foam in which polyether polyols of present use are employed, and superior in hydrolysis resistance compared with the urethane foam in which polyester polyols of present use are employed.

In a case of using the composition A for a sealant, if the polymer A is combined with an isocyanate compound hitherto-known public and the like, the resulting sealant is soft and tough and there are obtained effects on weather resistance, heat resistance, water resistance, chemical resistance, and impact resilience percentage which have not been seen in any conventional sealant composition. Furthermore, the sealant in which the composition of present invention is used is superior in heat resistance compared with a sealant which contains a polyether polyol of present use.

When a composition containing a vinyl-based monomer having one polymerizable unsaturated group per one molecule, in addition to the polymer having a polymerizable unsaturated group at both terminals (polymer B) obtained from a reaction of the polymer A with the compound (h) having two kinds of reactive groups in one molecule, that are a functional group capable of reacting with a hydroxyl group and a polymerizable unsaturated group, is used for a gel coat resin composition, resin composition for artificial marble, resin composition for laminated glass and so forth, there is obtained a resin which shows small reaction contraction in molding, low viscosity at working, excellent working efficiency, high hardness in a hardened matter, toughness and excellent weather resistance.

Artificial marble obtained from the aforementioned resin composition for artificial marble is superior in heat resistance and weather resistance and also, because contraction resulting from polymerization in molding is small because of using the aforementioned polymer B, a problem such as occurrence of cracking in the course of molding is solved. Also, because the polymer having polymerizable unsaturated group at both terminals is put into a crosslinking structure at the polymer terminals, the elasticity of moldings is greatly elevated by using a rubber ingredient for the polymer main chain, and there can be obtained moldings very superior in impact resistance. Further, by the same reason, the molding shows no breakage in the course of processing such as cutting and shaving, and excellent in the cutting and shaving performance.

Further, the polymerization contraction in the course of polymerization is suppressed and flexibility is given to the molding and, therefore, different from a case where a thermoplastic polymer not having a polymerizable unsaturated group is added as carried out conventionally, the polymer having a polymerizable unsaturated group at both terminals is put into a crosslinked structure even after molding, because the adding polymer has a polymerizable unsaturated group at both terminals. Accordingly, even if the adding amount increases, there does not occur a problem of decrease in heat resistance, and the flexibility is sufficiently given.

The polyurethane obtained from a reaction of the polymer A with the polyfunctional isocyanate compound (e) as well as the polyester obtained from a reaction of the polymer A with the compound (g) having two or more of a carboxyl group per one molecule: in using them as a molding material, the above polyurethane and polyester not only have soft and tough mechanical properties, but also display very excellent properties such as transparency, weather resistance, water resistance, hydrolysis resistance, oil resistance, chemical resistance and so forth depending upon a sort of the vinyl-based monomer component (a) constituting main chain of the polymer A and thus, they are very useful with the excellent properties.

The polymer (polymer C) having a carboxyl group at both terminals, obtained from a reaction of the polymer A with the compound (i) having two reactive groups in one molecule, one of which is a functional group capable of reacting with a hydroxyl group and the other of which is a carboxyl group, and/or with an acid anhydride, by choosing optionally a sort of the vinyl-based monomer (a) constituting a main chain of the polymer, has transparency, weather resistance, water resistance, hydrolysis resistance and chemical resistance, which is similar to the polymer A having hydroxyl groups, and also, various kinds of resins such as a polyester derived from the polymer C display excellent properties such as high stretching performance (excellent in bending processing) and toughness. Accordingly, the resins are useful as a raw material for coating, tacky and non-tacky adhesive, various molding materials, a resin modifier (an agent to afford impact resistance), vibration-controlling material, an elastic wall material, a floor material, fiber-processing material, an UV-EB-curable resin and the like. Furthermore, the polymer C is characterized in that it can be used as a hardening agent and an additive for an epoxy resin and the like, although a polymer having a hydroxyl group terminal can not be used as such the agent and additive.

Next, the resin composition characterized by containing the polymer C and the compound (j) having two or more of a functional group capable of reacting with the carboxyl group as essential components, by choosing optionally a sort of the vinyl-based monomer (a) constituting main chain of the polymer, has transparency, weather resistance, water resistance, hydrolysis resistance and chemical resistance, which is similar to the aforementioned composition containing the polymer A as an essential component, and also, various kinds of resins such as a polyester derived from the composition containing the polymer C display excellent properties such as high stretching performance (excellent in bending processing) and toughness. Accordingly, the resins are useful as raw material for coating, tacky and non-tacky adhesive, various molding materials, a resin modifier (an agent to afford impact resistance), vibration-controlling material, an elastic wall material, a floor material, fiber-processing material, an UV-EB-curable resin and the like. Furthermore, the composition containing the polymer C is characterized in that it can be used as an epoxy resin composition, with which it is difficult to use a polymer having hydroxyl groups at terminals.

In the epoxy resin composition characterized by containing the polymer C as an essential component, the toughness is improved by adding the polymer C into an epoxy resin as a rubber ingredient as well as an effect which is not in a conventional epoxy resin composition is obtained on heat resistance and weather resistance. After all, the epoxy resin composition, in which the polymer C of present invention is used, is superior in heat resistance and weather resistance, when compared with an epoxy resin composition of present use to which a polybutadiene polyol or a polybutadiene-acrylonitrile polyol copolymer is added.

What is claimed is:

1. A process for producing a polymer having a hydroxyl group at both terminals, which comprises carrying out a polymerization reaction of a vinyl-based monomer (a) which is at least one member selected from the group consisting of (meth)acrylic acid, an alkyl (meth)acrylate, an aryl (meth)acrylate, a substituted alkyl(meth)acrylate, a (meth)acrylic acid-ethylene oxide adduct, maleic anhydride, maleic acid, a monoalkyl ester of maleic acid, a dialkyl ester of maleic acid, a maleimide derivative and an amide group-containing vinyl-based monomer by using hydrogen peroxide (b);

said process being characterized in that a hydrogen peroxide-decomposing accelerator (c) which is at least one member selected from the group consisting of hydrochloric acid, hydrobromic acid, hydroiodic acid, perchloric acid, sulfuric acid, fuming sulfuric acid, nitric acid, fuming nitric acid, chromic acid, a sulfonic acid, an onium salt and a heterocyclic amine is further used, and that the total amount of any component other than (a), (b) and (c) is 5% by weight or less based on the total amount of all components.

2. A process for producing a polymer having a hydroxyl group at both terminals, which comprises carrying out a polymerization reaction of a vinyl-based monomer (a) which is at least one member selected from the group consisting of (meth)acrylic acid, an alkyl (meth)acrylate, an aryl (meth)acrylate, a substituted alkyl (meth)acrylate, a (meth)acrylic acid-ethylene oxide adduct, maleic anhydride, maleic acid, a monoalkyl ester of maleic acid, a dialkyl ester of maleic acid, a maleimide derivative and an amide group-containing vinyl-based monomer by using hydrogen peroxide (b);

said process being characterized in that an amphiphilic compound (d) which is at least one member selected from the group consisting of a cyclic ether, an ether having a chain structure, an ethylene glycol diether, a ketone, an amide and a sulfoxide is further used in a range of 1 to 5% by weight based on the total amount of all components, and that the total amount of any component other than (a), (b) and (d) is 5% by weight or less based on the total amount of all components.

3. The process as claimed in claim 1 further comprising an amphiphilic compound (d) which is at least one member selected from a group consisting of a cyclic ether, an ether having a chain structure, an ethylene glycol diether, a ketone, an amide and a sulfoxide, that the amount of said amphiphilic compound (d) used is in a range of 1 to 5% by weight based on the total amount of all components.

4. The process as claimed in claim 3, wherein, based on the total amount of all components, the amount used of the hydrogen peroxide-decomposing accelerator (c) is in a range of 0.01 to 20.0% by weight, the amount used of the amphiphilic compound (d) is in a range of 1.0 to 5.0% by weight, and the total amount used of (c) and (d) is in a range of 1.01 to 25.0% by weight.

5. The process as claimed in claim 1, wherein any component other than (a), (b) and (c) is not included.

6. The process as claimed in claim 2, wherein any component other than (a), (b), (c) is not included.

7. The process as claimed in claim 3, wherein (a), (b), (c) and (d) is not included.

8. The process as claimed in claim 3, wherein the amount used of hydrogen peroxide (b) is in a range of 0.5 to 30% by weight based on the vinyl-based monomer (a).

\* \* \* \* \*